(12) United States Patent
Light et al.

(10) Patent No.: US 12,173,854 B2
(45) Date of Patent: Dec. 24, 2024

(54) METHOD FOR TRANSFERRING CRYOGENIC FLUID USING A DEVICE FOR TRANSFERRING CRYOGENIC FLUID

(71) Applicant: L'Air Liquide, Societe Anonyme pour l'Etude et l'Exploitation des Procedes Georges Claude, Paris (FR)

(72) Inventors: Joshua Light, Houston, TX (US); Jerry Hayes, Houston, TX (US); Laurent Allidieres, Paris (FR); Thomas Fayer, Sassenage (FR); Cyril Benistand-Hector, Sassenage (FR)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 0 days.

(21) Appl. No.: 17/992,927

(22) Filed: Nov. 22, 2022

(65) Prior Publication Data

US 2023/0160534 A1 May 25, 2023

Related U.S. Application Data

(60) Provisional application No. 63/283,120, filed on Nov. 24, 2021, provisional application No. 63/282,115, filed on Nov. 22, 2021.

(51) Int. Cl.
*F17C 5/04* (2006.01)
*F17C 7/02* (2006.01)
(Continued)

(52) U.S. Cl.
CPC .................. *F17C 5/04* (2013.01); *F17C 7/02* (2013.01); *F17C 13/006* (2013.01); *F17C 13/04* (2013.01);
(Continued)

(58) Field of Classification Search
CPC .. F17C 5/04; F17C 7/02; F17C 13/006; F17C 13/04; F17C 2205/0134; F17C 2205/0323;
(Continued)

(56) References Cited

U.S. PATENT DOCUMENTS 4,662,181 A * 5/1987 Brigham ................... F17C 9/00
62/46.3
2001/0025655 A1* 10/2001 Yoshida ............... G05D 7/0641
137/563

(Continued)

FOREIGN PATENT DOCUMENTS

CN 104 197 183 12/2014
WO WO-2017010083 A1 * 1/2017

OTHER PUBLICATIONS

WO 2017010083 A1—English Translation (Year: 2017).*
International Search Report and Written Opinion for PCT/US2022/050807, mailed Apr. 12, 2023.

*Primary Examiner* — Timothy L Maust
*Assistant Examiner* — Christopher M Afful
(74) *Attorney, Agent, or Firm* — Justin K. Murray

(57) ABSTRACT

A cryogen storage vessel at an installation is filled with liquid cryogen from a liquid cryogen storage tank that has a pressure lower than that of the vessel. After headspaces of the vessel and tank are placed in fluid communication with another via a gas transfer vessel and are pressure-balanced, a pump in a liquid transfer line connected between the tank and the vessel is operated to transfer amounts of liquid cryogen from the tank to the vessel via the liquid transfer line and pump as amounts of gaseous cryogen are transferred, through displacement by the pumped cryogenic liquid, from the vessel to the tank.

7 Claims, 9 Drawing Sheets

(51) Int. Cl.
*F17C 13/00* (2006.01)
*F17C 13/04* (2006.01)

(52) U.S. Cl.
CPC ............... *F17C 2205/0134* (2013.01); *F17C 2205/0323* (2013.01); *F17C 2205/0326* (2013.01); *F17C 2205/0352* (2013.01); *F17C 2221/012* (2013.01); *F17C 2221/017* (2013.01); *F17C 2223/0161* (2013.01); *F17C 2223/033* (2013.01); *F17C 2225/0161* (2013.01); *F17C 2227/0135* (2013.01); *F17C 2227/0142* (2013.01); *F17C 2227/0157* (2013.01); *F17C 2227/0302* (2013.01); *F17C 2227/0337* (2013.01)

(58) Field of Classification Search
CPC ...... F17C 2205/0326; F17C 2205/0352; F17C 2221/012; F17C 2221/017; F17C 2223/0161; F17C 2223/033; F17C 2225/0161; F17C 2227/0135; F17C 2227/0142; F17C 2227/0157; F17C 2227/0302; F17C 2227/0337
USPC ............................................................ 141/1
See application file for complete search history.

(56) References Cited

U.S. PATENT DOCUMENTS

| | | | |
|---|---|---|---|
| 2020/0248870 A1* | 8/2020 | Allidieres | ............... B63B 79/10 |
| 2021/0364129 A1 | 11/2021 | Allidieres et al. | |
| 2023/0067726 A1 | 3/2023 | Light | |

* cited by examiner

METHOD FOR TRANSFERRING CRYOGENIC FLUID USING A DEVICE FOR TRANSFERRING CRYOGENIC FLUID

CROSS-REFERENCE TO RELATED APPLICATIONS

This patent application claims priority to U.S. Provisional Patent Application Ser. No. 63/282,115 filed on Nov. 22, 2021, and U.S. Provisional Patent Application Ser. No. 63/283,120 filed on Nov. 24, 2021, both of which are hereby incorporated by reference in their entireties.

FIELD OF THE INVENTION

The present invention relates to the transfer of liquid cryogen, preferably liquid hydrogen ($LH_2$), from a delivery tank to a storage vessel using pressure equalization and pumping.

BACKGROUND OF THE INVENTION

Depending on the heat content of a cryogenic liquid, the cryogenic liquid can be at various temperatures/saturation pressures. Any heat introduced through the transfer/delivery processes or in the final vessel is absorbed by the liquid, which increases the temperature/saturation pressure of the cryogenic liquid, and if the saturation pressure exceeds the pressure in the vessel, the cryogenic liquid will boil.

Liquid hydrogen sites that are supplying vehicles with hydrogen fuel typically use a reciprocating pump to pressurize the hydrogen from a liquid hydrogen storage tank to fueling pressures. This final vessel in the $LH_2$ supply chain introduces a significant amount of heat into the cryogenic liquid due to heat of vapor returning to the vessel from pump operation and from natural heat leak, which accumulates over the multiple days between deliveries. When liquid hydrogen is delivered at a low temperature/heat content, there is a higher capacity to absorb heat before the liquid hydrogen reaches the maximum pressure in the vessel and needs to be vented from the vessel. Therefore, the colder the liquid delivered, the higher the percentage of product delivered that can be usable and end up inside a vehicle tank (because there is less venting).

To operate a supply chain that delivers cold liquid, the molecules must be delivered with a specific method and device. A cold supply chain ensures that customers receive the maximum value for each molecule of $LH_2$ delivered and that all customers receive cold product. In addition to delivering cold liquid, the final vessel receives more of the $LH_2$ that is produced and the final vessel is able to dispense more of the hydrogen when using this method and device.

Heat in a Cryogenic System

The pressure in the vessel and the saturation pressure (temperature/heat content) of $LH_2$ determine how the $LH_2$ reacts when heat is introduced. If the saturation pressure is less than the pressure in the vessel, then the $LH_2$ will absorb some heat without vaporizing. Once the saturation pressure of the $LH_2$ is equivalent to the pressure in the vessel, any heat added to the $LH_2$ will cause the $LH_2$ to vaporize into $GH_2$. When the additional $GH_2$ is created in a vessel, the pressure in the vessel increases. If the vessel is already at the maximum operating pressure, then the additional $GH_2$ will need to be vented.

When a small amount of $LH_2$ is exposed to a significant heat source (e.g., pressure builder or pump) the heat can quickly increase the vapor pressure of the small amount of $LH_2$ to be greater than the pressure in the vessel and the heat vaporizes the small portion of $LH_2$ without heating the rest of the $LH_2$ in the trailer or vessel. This technique is used for building pressure in the vessel without immediately impacting the bulk $LH_2$ temperature.

Fluid Characteristics

Cryogenic liquids with a critical pressure near the storage pressure have a high proportion of mass in the gas phase. Typical cryogenic vessels store product up to ~200 psig, and hydrogen and helium have critical pressures that are lower than 200 psig (174 psig and 18.5 psig, respectively). When the pressure of the storage is near the critical pressure, the density of vapor approaches the density of liquid (see the density of hydrogen liquid and vapor as the pressure approaches 189 psia in FIG. 1).

Over the pressure range of typical cryogenic storage vessels, consider the contributions to the overall density of a biphasic fluid by the liquid portion and the gaseous portion. In comparison to other typical cryogenic liquids with much higher critical temperatures, such as liquid nitrogen, the proportion of density from the hydrogen vapor versus the proportion of density from the liquid at a same pressure is much higher. In other words, for a given volume of biphasic hydrogen, a ratio of a mass of the vapor to a mass of the liquid is much higher than the ratio for biphasic nitrogen. FIG. 2 provides nitrogen density at saturated conditions, and FIG. 3 provides a graphical representation of proportion of vapor density vs saturation pressure of hydrogen and nitrogen.

Due to the relatively large fraction of mass in the gas phase, there are a couple of unique characteristics that affect $LH_2$ deliveries: significant volume of gas condensate and significant heat content of the vapor. These effects are embodied with the example below:

A 1,000 gal container holds 10% liquid hydrogen (100 gal $LH_2$) and the remainder is gaseous hydrogen (900 gal $GH_2$) at saturated conditions of 140 psig (31.7 K). In order to reach 90% liquid in the container (900 gal of liquid), 410.3 gallons of liquid hydrogen at 70 psig saturated conditions (28.0 K) are added to the container, and the resulting pressure in the container is 142.4 psig (31.8 K).

For comparison, a 1,000 gal container holds 10% liquid nitrogen (100 gal LIN) and the remainder is gaseous nitrogen (900 gal GAN) at saturated conditions of 140 psig (104.8 K). In order to reach 90% liquid in the container (900 gal of liquid), 720.2 gallons of liquid nitrogen at 70 psig saturated conditions (96.0 K) are added to the container, and the resulting pressure in the container is 105.3 psig (100.9 K).

There is a large difference in the amount of liquid added to the container to reach 90% liquid and the final saturation pressure.

When a cold fluid is introduced to a container, the warm gas condenses, and because of the large mass fraction in the gas phase of hydrogen, the mass of condensate occupies a considerable portion of the container. In the example above, only 410.3 gallons of $LH_2$ are added for a total liquid increase of 800 gallons. Condensate from the gas phase formed the remaining 389.7 gallons.

Next the final temperature (saturation pressure) of the hydrogen is warmer than either of the initial fluids; whereas the final temperature (saturation pressure) of nitrogen is between the initial warm container temperature and the cold incoming liquid nitrogen temperature. The hydrogen gas phase carries a significant amount of heat due to vapor naturally having a much higher heat content than liquid and the high relative density of hydrogen gas near the critical pressure. Because of the high heat content of vapor, the vapor plays an important role in heat management for fluids with low critical pressures. The impact of this high heat content of the vapor is especially noticeable when systems are mixed to thermodynamic equilibrium, and the result is a temperature/saturation pressure that is higher than one would expect from working with other cryogenic fluids. Below is the proportion of heat stored in a volume of gas as compared to the same volume of liquid. (Liquid has a much higher density but lower heat content resulting in a higher heat content per volume—See e.g., FIG. 4 and FIG. 5.)

The proportion of heat in the hydrogen vapor as compared to hydrogen liquid is more than two times greater than the proportion in nitrogen (a more typical cryogenic fluid)—See e.g., FIG. 6.

STATE OF THE ART

Conventional liquid hydrogen trailers typically have the following circuits relevant for making a delivery: pressure builder and $LH_2$ delivery line. Many other circuits are on the trailer to maintain the appropriate pressure, monitor trailer conditions, and fill the trailer with more $LH_2$. The relevant circuits for the delivery to the final vessel are shown in FIG. 10.

FIG. 7 provides a flow chart for a typical product distribution chain.

Typically a driver makes two to four deliveries per trailer load of product. The conventional delivery method and distribution scheme cause a large amount of heat to be present in the final vessel. Also, the distribution process is inefficient because the $LH_2$ is turned into $GH_2$ to propel the delivery.

Similar Delivery Solution

Deliveries of liquid $CO_2$ and $N_2O$ include a pump, a liquid hose, and a gas transfer hose for the purpose of avoiding the venting of greenhouse gases and toxic gases to the atmosphere. Installations including liquid $CO_2$ or liquid $N_2O$ storage vessels are very different from installations that pump hydrogen from a liquid hydrogen storage tank. At $CO_2$ and NOx installations, the customer typically receives gas and the molecules have a high critical pressure: 1,071 psig and 1,051 psig, respectively. $CO_2$ and NOx supply chains are not focused on refrigeration because the user intentionally adds heat to the storage vessel in order to increase pressure for feeding the product to the customer. Indeed, heat is purposefully added to the $CO_2$ and NOx storage vessels in order to build pressure. Additionally, many parts of the delivery system add heat to the process fluid.

Delivery Process

Conventional deliveries consist of several major steps: connecting, purging and cool down, pressure building and delivery, disconnecting, and decreasing pressure in the trailer. First, a vacuum jacketed hose is connected from the trailer to the final vessel. Next, the hoses are purged with a flow of $GH_2$ from the vapor space of the trailer. Next, the hoses are purged with several pressure pulses of $GH_2$ from the vapor space of the trailer. After purging, liquid hydrogen from the trailer flows through the piping and hose to a vent in order for the piping/hoses to reach cold temperatures. The preparation steps often consume around 30 kg of hydrogen.

While the purging and cool down steps are taking place, the driver operates the pressure builder to increase the pressure in the trailer to 1-2 bar above the pressure in the final vessel, which can take around 20 minutes depending on the amount of vapor space in the trailer. Once the trailer is at the appropriate pressure, the driver opens the valves to allow $LH_2$ to flow to the final vessel. During the offloading of $LH_2$, the driver continues operating the pressure builder to keep the pressure in the trailer 1-2 bar above the pressure in the final vessel. When the final vessel is full, the driver closes the $LH_2$ delivery valves. Next, the driver waits for the delivery hose to warm a little and then the driver disconnects the $LH_2$ hoses. Before driving away, the driver will slosh the trailer or vent the trailer to decrease pressure and ensure that the trailer will not vent while driving over the road.

A major aspect of the delivery is that all flows of hydrogen begin from the trailer and move toward the final vessel. Because of this, the valuable, cold $LH_2$ is the source for all hydrogen used for purging and cool down of the piping/hoses prior to delivery. This is one example of poor use of the cold cryogenic liquid.

Heat Introductions and Transfers

In the conventional delivery process, there are a couple of steps that play an important role in the behavior of heat in the system: pressure building and sloshing.

For each delivery, the driver flows liquid hydrogen through an atmospheric heat exchanger to add heat into the $LH_2$ flowing through the atmospheric heat exchanger causing it to vaporize and increase the pressure in the trailer. The driver builds pressure in the trailer when he/she arrives at the site so that the pressure in the trailer exceeds the pressure in the final vessel. The driver also builds pressure while the delivery takes place to maintain a pressure in the trailer that is at least 1 bar greater than the pressure in the final vessel. Pressure building adds a significant amount of heat to the gas phase of the trailer.

Sloshing is the process of moving the trailer forward and backward to allow the liquid hydrogen to slosh around the trailer and mix with the vapor phase of the trailer. During this process, the heat in the vapor space and the liquid is spread throughout both fluids and the system reaches thermodynamic equilibrium. Because the vapor phase has additional heat from pressure building, sloshing will spread the heat that was in the vapor phase throughout the vapor and liquid phases. Sloshing causes the pressure in the trailer to decrease and the heat content of the $LH_2$ to increase and some of the gas condenses into liquid.

Heat in the Trailer

During a delivery, heat is added by the pressure builder to increase the pressure in the trailer. The heat is used to convert $LH_2$ to $GH_2$ in order to build pressure in the trailer and the heat primarily remains in the vapor phase of the trailer. The amount of heat added depends on the pressure that the trailer must reach to make a delivery. If the pressure in the final vessel is elevated, then the pressure builder adds more heat to reach the higher pressure in the trailer to initiate a delivery. At the end of a delivery, the pressure in the trailer is at least 1 bar greater than the pressure in the final vessel. After a delivery, the pressure in the trailer must be reduced from the very high state (pressure in the final vessel+1 bar) by sloshing the trailer or venting the trailer. To prevent losing molecules of hydrogen by venting, the driver typically sloshes if possible. During the sloshing process, the trailer reaches thermodynamic equilibrium, and the heat introduced by the pressure builder is spread throughout the $LH_2$ as well as the $GH_2$. A typical evolution of the temperature in a trailer is shown below. For this set of assumptions (also including the use of a jumbo trailer, delivery of a same maximum quantity to each of two vessels, a final vessel pressure of 120 psig prior to delivery), the average delivery temperature is 24 K (22.3 K for the first delivery and 25.5 K for the second delivery)—See FIG. 8.

Assumptions: jumbo trailer, deliver maximum quantity to two vessels (same amount to each vessel), final vessels are at 120 psig prior to the delivery.

The final vessel operates better when the delivered liquid has a low temperature/heat content/saturation pressure, and the ideal delivery technique will deliver cold liquid to all final vessels. For this set of assumptions, the traditional delivery method causes the temperature of the $LH_2$ to warm by 3.5 K (28.1 psi saturation pressure) after the first delivery to a typical vessel (at 120 psig operating pressure). The $LH_2$ temperature would warm again if the trailer were taken for a third delivery in this trip. The low critical pressure of hydrogen contributes to the substantial temperature/saturation pressure increase in the trailer after a delivery.

Heat in the Final Vessel During a Delivery

The amount of heat in the final vessel after a delivery is based on the amount of heat in the final vessel before the delivery and the heat content of the $LH_2$ delivered to the final vessel. The interaction of heat and mass during the traditional delivery process will be explored further in this section.

For final vessels at pumping sites at which $LH_2$ is pumped from the final vessel to a point of use, the $LH_2$ driver always fills the final vessel from the top of the vessel because the operator prefers the pressure in the final vessel to be as low as possible. In this configuration, the incoming $LH_2$ mixes with the $GH_2$ in the final vessel and the contents of the vessel reach thermodynamic equilibrium. The $GH_2$ in the final vessel contains a large amount of heat so the final temperature in the vessel is much higher than the temperature of the incoming liquid. This is shown in FIG. 9.

As noted before, the incoming temperature of the liquid and the delivery method play an important role in the resulting temperature of the final vessel. The traditional delivery method combines all the initial heat in the final vessel with the heat from the incoming $LH_2$, so the sum of the initial heat in the vessel and the heat from the incoming $LH_2$ remains in the vessel.

Heat in the Final Vessel after a Delivery

During operation at the above-described pumping site, heat is added to the final vessel by pump operation and natural heat leak. Operation of reciprocating pumps also introduces heat because some of the $LH_2$ is vaporized by heat at the pump and returned to the vessel. This vapor returns to the vessel via a suction return line. The amount of heat input from the pump is substantial and this heat input frequently causes the vessel to vent. In addition, the final vessel typically holds a delivery of product for several days, which allows heat from the natural heat leak to accumulate in the final vessel.

FIG. 11 provides a graphical display showing where heat leaks primarily occur.

Hydrogen fueling requires hydrogen to be pumped to pressures much higher than typical industrial uses (e.g., 900 bar for fueling as compared to ~200 bar for industrial uses). Because of the high-pressure needs, the pumps require more subcooling and the pumps return more heat to the system. See page 1 line 20 through page 8 line 2 of U.S. patent application Ser. No. 17/465,103 for more details.

Supply Chain Inefficiencies

Hydrogen fueling sites need $LH_2$ to pump for fueling fuel cell electric vehicles (FCEVs), and the gaseous hydrogen is of little or no use at the pumping site. The conventional supply chain practices introduce many inefficiencies by adding heat (pressure builder) which converts $LH_2$ into $GH_2$ and reduces the amount of $LH_2$ available for the final vessel. Using a traditional delivery method, a trip to two vessels with the assumed conditions (pressure of the vessel is at 120 psig prior to the delivery), and 19% of the $LH_2$ is used to make $GH_2$ for pressurizing the trailer (see FIG. 12 below, 5.4 TPD of the 28.5 TPD). This 19% of product that is converted to $GH_2$ cannot be delivered to the final vessel and is a major inefficiency in the supply chain. In addition, the heat in the vapor phase after a delivery is mixed with the remaining $LH_2$ in the trailer, which creates a warm $LH_2$ that is less valuable. As discussed before, the average temperature of $LH_2$ delivered to the final vessel is 24 K.

Other Solutions

Some $LH_2$ distributors use a centrifugal transfer pump to deliver $LH_2$. The pump can be used to pressurize the $LH_2$ in so that the amount of pressure building is decreased. Due to the high pressure of the final vessel, the pump needs the capability of pumping a large head pressure (around 5 bar). When liquid hydrogen is pumped to high pressures, the pump adds heat and work to the $LH_2$ and the $LH_2$ travelling to the final vessel increases in heat content. The final vessel already struggles from too much heat, and the centrifugal pump exacerbates the problem by adding more heat. Even when pumping, the pressure builder is used because the space evacuated by liquid leaving the trailer must be filled by gas and a sufficient pressure differential between the trailer and the final vessel must be maintained. By pumping, there is less heat added to the trailer than from a traditional delivery, so when the trailer is mixed after the delivery, the $LH_2$ is not as warm as the current supply chain. The pump adds more heat to the $LH_2$ delivered to the final vessel, which further compounds the issue of too much heat in the final vessel.

SUMMARY OF THE INVENTION

In certain embodiments, the invention can include a method and a device that proposes a fundamentally unique system for preserving cold in a cryogenic supply chain. The delivery technique that enables a cold cryogenic supply chain is termed the advanced delivery method. All aspects of this supply chain are intended to minimize or prevent the addition of heat and conserve the cold of the cryogenic liquid.

There is disclosed a method of filling a liquid cryogen storage vessel installed at an installation with liquid cryogen from a liquid cryogen storage tank, the liquid cryogen preferably being liquid hydrogen or liquid helium and more preferably being liquid hydrogen, comprising the steps of:

connecting a liquid transfer conduit from the liquid cryogen storage tank to the liquid cryogen storage vessel, the liquid transfer conduit having a first liquid cryogen pump disposed in-line, the connected liquid transfer conduit being in selectable fluid communication, via one or more valves, between a liquid cryogen space in the liquid cryogen storage tank, in which is stored an amount of liquid cryogen, and a liquid cryogen space in the liquid cryogen storage vessel, in which is stored an amount of the liquid cryogen, wherein, prior to said step of connecting a liquid transfer conduit, the liquid cryogen storage vessel has an initial pressure higher than an initial pressure of the liquid cryogen storage tank;

connecting a gas transfer conduit between the liquid cryogen storage vessel and the liquid cryogen storage tank that is in selectable fluid communication between headspace of the liquid cryogen storage vessel, which contains an amount of the liquid cryogen in gaseous form, and a headspace of the liquid cryogen storage tank, which contains an amount of the gaseous cryogen, via one or more valves disposed in the gas transfer conduit;

pressure-equalizing the liquid cryogen storage vessel and liquid cryogen storage tank headspaces by opening one or more of the valves in the gas transfer conduit, thereby allowing the cryogenic gas to be transferred from the liquid cryogen storage vessel headspace to the liquid cryogen storage tank headspace by virtue of a difference between their initial pressures;

opening the one or more valves in the liquid transfer line thereby allowing fluid communication between the liquid cryogen spaces of the liquid cryogen storage tank and the liquid cryogen storage vessel;

pumping an amount of the liquid cryogen from the liquid cryogen space of the liquid cryogen storage tank to the liquid cryogen space of the liquid cryogen storage vessel via the liquid transfer line and first pump as amounts of the gaseous cryogen flow from the liquid cryogen storage vessel headspace to the liquid cryogen storage tank headspace caused by said pumping, wherein optionally, said step of pumping commences when a difference in pressure between the tank headspace and the vessel headspace, prior to initiating said pumping, reaches zero or a predetermined pressure of less than 1 bar.

In optional embodiments of the method of filling a liquid cryogen storage vessel:

said pressure-equalization occurs without the use of a compressor or vacuum pump;

the liquid cryogen is transferred from the liquid cryogen space of the liquid cryogen storage tank to the liquid cryogen space of the liquid cryogen storage vessel without the use of a pressure-building circuit;

the method can include the step of, prior to said pressure-equalization, purging the gas transfer conduit and/or the liquid transfer conduit with amounts of gaseous cryogen from the liquid cryogen storage vessel headspace;

the method can include the step of, prior to said pressure-equalization and optionally after any purging of the gas and liquid transfer conduits, precooling the gas transfer conduit and/or the liquid transfer conduit with amounts of gaseous cryogen from the liquid cryogen storage vessel headspace;

the method can include the step of, prior to said pressure-equalization and optionally after any precooling of the gas and liquid transfer conduits, cooling the gas transfer conduit and/or the liquid transfer conduit with amounts of liquid cryogen from the liquid cryogen space of the liquid cryogen storage tank;

the first pump compresses the liquid cryogen from the liquid cryogen storage tank to a pressure that is a predetermined value above a pressure of the vessel;

the predetermined value is less than 3 bar, preferably less than 2 bar, more preferably no more than 1 bar;

the first pump is a centrifugal pump;

a second cryogenic liquid pump is operatively associated with the vessel and said second pump and the vessel are adapted and configured to allow the second pump to pump amounts of the liquid cryogen from the liquid cryogen space of the vessel to a point of use at the installation;

one or more of the gas transfer conduit, the liquid transfer conduit, and the first pump are vacuum-jacketed;

a drive operatively associated with the first pump that is adapted and configured to drive the first pump is vacuum-jacketed or is located external from vacuum-jacketing of the first pump;

the one or more valves of the gas transfer conduit comprises a first valve adjacent to the liquid cryogen storage tank and a second valve adjacent to the vessel, the one or more valves of the liquid transfer conduit comprises a first valve adjacent to the liquid cryogen storage tank and a second valve adjacent to the vessel, and said method further comprises the steps of:

stopping operation of the first pump;

closing the first and second valves of the gas transfer conduit;

closing the first and second valves of the liquid transfer conduit;

waiting an amount of time, optionally predetermined, for portions of the gas transfer conduit in between the first and second valves thereof to be warmed by the ambient and portions of the liquid transfer conduit in between the first and second valves thereof to be warmed by the ambient; and after said step of waiting, venting the portions of the gas transfer conduit between the first and second valves thereof of and the portions of the liquid transfer conduit between the first and second valves thereof;

prior to said step of pumping, the liquid cryogen in the liquid cryogen space of the vessel has an initial temperature higher than an initial temperature of the liquid cryogen in the liquid cryogen space of the liquid cryogen storage tank;

prior to said step of pumping, the liquid cryogen in the liquid cryogen space of the vessel has an initial saturation temperature; and after performance of said method, the liquid cryogen in the liquid cryogen space of the vessel has a saturation temperature lower than the initial saturation temperature;

heat is removed from the vessel by performance of said method; and/or a coupled system is made up of the liquid cryogen storage tank and vessel connected by the gas and liquid transfer conduits and no heat is added to the coupled system other than through heat leak from ambient and addition of heat from operation of the pump.

There is also disclosed a method of supplying liquid cryogen to multiple cryogen storage vessels installed at different installations, the liquid cryogen preferably being liquid hydrogen or liquid helium, more preferably liquid hydrogen, comprising the steps of:

a) connecting a liquid transfer conduit from a liquid cryogen storage tank of a liquid cryogen tanker to a first liquid cryogen storage vessel installed at a first installation, the liquid transfer conduit having a first liquid cryogen pump disposed in-line, the connected liquid transfer conduit being in selectable fluid communication, via one or more valves, between a liquid cryogen space in the liquid cryogen storage tank, in which is stored an amount of liquid cryogen, and a liquid cryogen space in the first vessel, in which is stored an amount of the liquid cryogen, wherein, prior to said step of connecting a liquid transfer conduit, the first vessel has an initial pressure higher than an initial pressure of the liquid cryogen storage tank prior to said connection of the liquid transfer conduit between the tanker and the first vessel;

b) connecting a gas transfer conduit between the first vessel and the liquid cryogen storage tank that is in selectable fluid communication between a headspace of the first vessel, which contains an amount of the liquid cryogen in gaseous form, and a headspace of the liquid cryogen storage tank, which contains an amount of the gaseous cryogen, via one or more valves disposed in the gas transfer conduit;

c) pressure-equalizing the liquid cryogen storage tank headspace and the headspace of the first vessel by opening one or more of the valves in the gas transfer conduit, thereby allowing the cryogenic gas to be transferred from the headspace of the first vessel to the liquid cryogen storage tank headspace by virtue of a difference between their initial pressures;

d) opening the one or more valves in the liquid transfer line thereby allowing fluid communication between the liquid cryogen space of the liquid cryogen storage tank and the liquid cryogen space of the first vessel;

e) pumping an amount of the liquid cryogen from the liquid cryogen space of the liquid cryogen storage tank to the liquid cryogen space of the first vessel via the liquid transfer line and first pump as amounts of the gaseous cryogen flow from the headspace of the first vessel to the liquid cryogen storage tank headspace caused by said pumping, the liquid cryogen storage tank having an intermediate pressure after completion of said step of pumping;

f) disconnecting the gas and liquid transfer conduits between the liquid cryogen storage tank and the first vessel;

g) after disconnection of the gas and liquid transfer conduits between the liquid cryogen storage tank and the first vessel, driving the liquid cryogen tanker from the first installation to a second installation at which is installed a second liquid cryogen storage vessel;

h) after said step of driving, connecting a liquid transfer conduit from the first liquid cryogen storage tank to the second liquid cryogen storage vessel, the liquid transfer conduit having a first liquid cryogen pump disposed in-line, the connected liquid transfer conduit being in selectable fluid communication, via one or more valves, between a liquid cryogen space in the liquid cryogen storage tank, in which is stored an amount of liquid cryogen, and a liquid cryogen space in the second vessel, in which is stored an amount of the liquid cryogen, wherein, after said step of driving and prior to connection of the liquid transfer conduit between the liquid cryogen storage tank and the first vessel, the second vessel has an initial pressure higher than the intermediate pressure;

i) connecting a gas transfer conduit between the second vessel and the liquid cryogen storage tank that is in selectable fluid communication between a headspace of the second vessel, which contains an amount of the liquid cryogen in gaseous form, and a headspace of the liquid cryogen storage tank, which contains an amount of the gaseous cryogen, via one or more valves disposed in the gas transfer conduit;

j) pressure-equalizing the liquid cryogen storage tank headspace and the headspace of the second vessel by opening one or more of the valves in the gas transfer conduit, thereby allowing the cryogenic gas to be transferred from the headspace of the second vessel to the liquid cryogen storage tank headspace by virtue of a difference between the intermediate pressure and the initial pressure of the second vessel;

k) opening the one or more valves in the liquid transfer line thereby allowing fluid communication between the liquid cryogen space of the liquid cryogen storage tank and the liquid cryogen space of the second vessel; and l) pumping an amount of the liquid cryogen from the liquid cryogen space of the liquid cryogen storage tank to the liquid cryogen space of the second vessel via the liquid transfer line and first pump as amounts of the gaseous cryogen flow from the headspace of the second vessel to the liquid cryogen storage tank headspace caused by said pumping.

In optional embodiments of the method of supplying liquid cryogen to multiple cryogen storage vessels installed at different installations:

the pressure-equalizations between the headspace of the liquid cryogen storage tank and the headspace of the first vessel and between the headspace of the liquid cryogen storage tank and the headspace of the second vessel occurs without the use of a compressor or vacuum pump;

the liquid cryogen is transferred from the liquid cryogen space of the liquid cryogen storage tank to the liquid cryogen space of the first vessel and from the liquid cryogen space of the liquid cryogen storage tank to the liquid cryogen space of the second vessel without the use of a pressure-building circuit;

the method can further include the step of:
  prior to pressure-equalization between the liquid cryogen storage tank and the first vessel, purging the gas transfer conduit and/or the liquid transfer conduit with amounts of gaseous cryogen from the headspace of the first vessel; and/or
  prior to pressure-equalization between the liquid cryogen storage tank and the second vessel, purging the gas transfer conduit and/or the liquid transfer conduit with amounts of gaseous cryogen from the headspace of the second vessel;

the method can further include the step of:
  prior to pressure-equalization between the liquid cryogen storage tank and the first vessel and optionally after any purging of the gas and liquid transfer conduits between the liquid cryogen storage tank and the first vessel, precooling the gas transfer conduit and/or the liquid transfer conduit with amounts of gaseous cryogen from the headspace of the first vessel; and/or
  prior to pressure-equalization between the liquid cryogen storage tank and the second vessel and optionally after any purging of the gas and liquid transfer conduits between the liquid cryogen storage tank and the second vessel, precooling the gas transfer conduit and/or the liquid transfer conduit with amounts of gaseous cryogen from the headspace of the second vessel;

the method can further include the step of, prior to pressure-equalization between the liquid cryogen storage tank and the first vessel and optionally after any precooling of the gas and liquid transfer conduits between the liquid cryogen storage tank and the first vessel, cooling the gas transfer conduit and/or the liquid transfer conduit with amounts of liquid cryogen from the liquid cryogen space of the liquid cryogen storage tank;

the first pump compresses the liquid cryogen from the liquid cryogen storage tank to a pressure that is a predetermined value above a pressure of the first vessel, preferably the predetermined value being less than 3 bar, more preferably less than 2 bar, and even more preferably no more than 1 bar;

the first pump compresses the liquid cryogen from the liquid cryogen storage tank to a pressure that is a predetermined value above a pressure of the second vessel, preferably the predetermined value being less than 3 bar, more preferably less than 2 bar, and even more preferably no more than 1 bar;

the first pump is a centrifugal pump;

a second cryogenic liquid pump is operatively associated with the first vessel and said second pump and the first vessel are adapted and configured to allow the second pump to pump amounts of the liquid cryogen from the liquid cryogen space of the first vessel to a point of use at the first installation;

a third cryogenic liquid pump is operatively associated with the second vessel and said third pump and the second vessel are adapted and configured to allow the third pump to pump amounts of the liquid cryogen from the liquid cryogen space of the second vessel to a point of use at the second installation;

one or more of the gas transfer conduit, the liquid transfer conduit, the first pump, and the second pump are vacuum-jacketed;

a drive operatively associated with the first pump that is adapted and configured to drive the first pump is vacuum-jacketed or is located external from vacuum-jacketing of the first pump;

the one or more valves of the gas transfer conduit comprises a first valve adjacent to the liquid cryogen storage tank and a second valve adjacent to the first vessel, the one or more valves of the liquid transfer conduit comprises a first valve adjacent to the liquid cryogen storage tank and a second valve adjacent to the first vessel, and said method further comprises the steps of:

stopping operation of the first pump;

closing the first and second valves of the gas transfer conduit;

closing the first and second valves of the liquid transfer conduit;

waiting an amount of time, optionally predetermined, for portions of the gas transfer conduit in between the first and second valves thereof to be warmed by the ambient and portions of the liquid transfer conduit in between the first and second valves thereof to be warmed by the ambient; and after said step of waiting, venting the portions of the gas transfer conduit between the first and second valves thereof of and the portions of the liquid transfer conduit between the first and second valves thereof;

the one or more valves of the gas transfer conduit comprises a first valve adjacent to the liquid cryogen storage tank and a second valve adjacent to the second vessel, the one or more valves of the liquid transfer conduit comprises a first valve adjacent to the liquid cryogen storage tank and a second valve adjacent to the second vessel, and said method further comprises the steps of:

stopping operation of the first pump;

closing the first and second valves of the gas transfer conduit;

closing the first and second valves of the liquid transfer conduit;

waiting an amount of time, optionally predetermined, for portions of the gas transfer conduit in between the first and second valves thereof to be warmed by the ambient and portions of the liquid transfer conduit in between the first and second valves thereof to be warmed by the ambient; and after said step of waiting, venting the portions of the gas transfer conduit between the first and second valves thereof of and the portions of the liquid transfer conduit between the first and second valves thereof;

prior to said step (e), the liquid cryogen in the liquid cryogen space of the first vessel has an initial temperature higher than an initial temperature of the liquid cryogen in the liquid cryogen space of the liquid cryogen storage tank during step (a);

prior to said step (1), the liquid cryogen in the liquid cryogen space of the second vessel has an initial temperature higher than an initial temperature of the liquid cryogen in the liquid cryogen space of the liquid cryogen storage tank during step (h);

prior to said step (a), the liquid cryogen in the liquid cryogen space of the first vessel has an initial saturation temperature; and after performance of said step (e), the liquid cryogen in the liquid cryogen space of the first vessel has a saturation temperature lower than the initial saturation temperature;

prior to said step (h), the liquid cryogen in the liquid cryogen space of the second vessel has an initial saturation temperature; and after performance of said step (1), the liquid cryogen in the liquid cryogen space of the second vessel has a saturation temperature lower than the initial saturation temperature;

heat is removed from the first and second vessels by performance of said method;

a coupled system is comprised of the liquid cryogen storage tank and the first vessel connected by the gas and liquid transfer conduits and no heat is added to the coupled system other than through heat leak from ambient and addition of heat from operation of the pump; and/or a coupled system is made up of the liquid cryogen storage tank and the second vessel connected by the gas and liquid transfer conduits and no heat is added to the coupled system other than through heat leak from ambient and addition of heat from operation of the pump.

There is also disclosed a system for filling a cryogen storage vessel with liquid cryogen, comprising: a liquid cryogenic tanker having a liquid cryogen storage tank adapted and configured to store the liquid cryogen, wherein the liquid cryogen is selected from the group consisting of hydrogen and helium; a gas transfer conduit having: first and second ends, a first valve adjacent the first end thereof, and a second valve adjacent the second end thereof, the first and second valves of the gas transfer conduit being adapted and configured to allow or prevent transfer of a gaseous cryogen from a headspace of a liquid storage vessel to be filled to a headspace of the liquid cryogen storage tank; a liquid transfer conduit having: first and second ends, a first valve adjacent the first end thereof, a second valve adjacent the second end thereof, and a liquid cryogen pump disposed between the first valve and the second valve, the first and second valves of the liquid transfer conduit being adapted and configured to allow or prevent transfer of liquid cryogen from a liquid cryogen storage space of the liquid cryogen storage tank to a liquid cryogen storage space of a vessel to be filled; and an electronic controller adapted and configured to: open the first and second valves of the gas transfer conduit while the first and second valves of the liquid transfer conduit are closed so as to allow a flow of gaseous cryogen from a headspace of a vessel to be filled to the headspace of the liquid cryogen storage tank; open the first and second valves of the liquid transfer conduit, allow the first and second valves of the gas transfer conduit to remain open, and to operate the pump so as to pump amounts of liquid cryogen from the liquid cryogen space of the liquid cryogen storage tank to a liquid cryogen space of a vessel to be filled and allow gaseous cryogen to flow from a headspace of the vessel to be filled to the headspace of the liquid cryogen storage tank.

In another embodiment, the system can also include a vent line disposed in the gas transfer conduit that is in parallel flow communication with the first and second ends thereof and a vent line disposed in the liquid transfer conduit that is in parallel flow communication with the first and second valves thereof, wherein the gas transfer conduit further comprises a third valve that is configured to allow or prevent fluid to be vented from the vent line thereof, wherein the liquid transfer conduit further comprises a third valve that is configured to allow or prevent fluid to be vented from the vent line thereof; and the electronic controller is further adapted and configured to open the first valve.

There is also disclosed a coupled system for filling a cryogen storage vessel with liquid cryogen, comprising:

a liquid cryogenic tanker having a liquid cryogen storage tank which has a liquid cryogen space adapted and configured to store liquid cryogen, preferably liquid hydrogen or liquid helium, more preferably liquid hydrogen, and a headspace over the liquid cryogen space thereof containing gaseous cryogen;

a cryogenic storage vessel comprising a liquid cryogen space adapted and configured to store liquid cryogen, preferably liquid hydrogen or liquid helium, more preferably liquid hydrogen, and a headspace over the liquid cryogen space thereof containing gaseous cryogen;

a gas transfer conduit having first and second ends, a first valve adjacent the first end thereof, and a second valve adjacent the second end thereof, the first end thereof being connected to the liquid cryogen storage tank in fluid tight fashion so as to be selectably placed in fluid communication with the liquid cryogen storage tank headspace, the second end thereof being connected to the vessel in fluid tight fashion so as to be selectably placed in fluid communication with the vessel headspace, the first and second valves of the gas transfer conduit being adapted and configured to allow or prevent transfer of gaseous cryogen from the vessel headspace to the liquid cryogen storage tank headspace;

a liquid transfer conduit having first and second ends, a first valve adjacent the first end thereof, a second valve adjacent the second end thereof, and a liquid cryogen pump therebetween, the first end thereof being connected to the liquid cryogen storage tank in fluid tight fashion so as to be selectably placed in fluid communication with the liquid cryogen space of the liquid cryogen storage tank, the second end thereof being connected to the vessel in fluid tight fashion so as to be selectably placed in fluid communication with the liquid cryogen space of the vessel, the first and second valves of the liquid transfer conduit being adapted and configured to allow or prevent transfer of liquid cryogen from the liquid cryogen storage space of the liquid cryogen storage tank to the liquid cryogen storage space of the vessel; and an electronic controller adapted and configured to:
open the first and second valves of the gas transfer conduit while the first and second valves of the liquid transfer conduit are closed so as to allow a flow of gaseous cryogen from the vessel headspace to the liquid cryogen storage tank headspace; and
open the first and second valves of the liquid transfer conduit, allow the first and second valves of the gas transfer conduit to remain open, and to operate the pump so as to pump amounts of liquid cryogen from the liquid cryogen space of the liquid cryogen storage tank to the liquid cryogen space of the vessel and allow gaseous cryogen to flow from the vessel headspace to the liquid cryogen storage tank headspace.

In another embodiment, the coupled system can also include a vent line disposed in the gas transfer conduit that is in parallel flow communication with the first and second ends thereof and a vent line disposed in the liquid transfer conduit that is in parallel flow communication with the first and second valves thereof, wherein the gas transfer conduit further comprises a third valve that is configured to allow or prevent fluid to be vented from the vent line thereof, wherein the liquid transfer conduit further comprises a third valve that is configured to allow or prevent fluid to be vented from the vent line thereof; and the electronic controller is further adapted and configured to open the first valve.

There is also disclosed a cryogenic fluid transfer device comprising: a first tank, a second tank, and a fluid transfer circuit, wherein the first tank comprises a cryogenic fluid distribution tank configured to store a cryogenic fluid in a liquid phase in a lower part thereof and in a gaseous phase in an upper part thereof, wherein the second tank comprises a cryogenic receiving tank configured to house the cryogenic fluid in liquid phase in a lower part thereof and in gaseous phase in an upper part thereof, wherein the fluid transfer circuit is configured to connect the first and second tanks, the fluid transfer circuit comprising a first pipe connecting the upper parts of the first and second tanks and comprising at least one valve, and a second pipe connecting the lower part of the first tank to the second tank that comprises a pump that has an inlet connected to the first tank and an outlet connected to the second tank, wherein: the pump and the at least one valve of the first line are configured so as to ensure a fluidic connection of the upper parts of the first and second tanks by opening the at least one valve during a transfer of the cryogenic fluid in liquid phase from the first tank to the second tank with the pump.

In an optional embodiment, the cryogenic fluid transfer device can also include a third pipe that connects the upper part of the second tank to the lower part of the first tank, the third pipe comprising a valve.

There is also disclosed a method for transferring cryogenic fluid using a device for transferring cryogenic fluid, wherein the device comprises a first tank configured to distribute a cryogenic fluid and to store a cryogenic fluid in liquid phase in a lower part therein and in gaseous phase in an upper part therein at an initial pressure, a second cryogenic tank configured to accommodate the cryogenic fluid from the first tank in liquid phase in a lower part therein and in gaseous phase in an upper part therein at a second initial pressure, and a fluid transfer circuit connecting the first and the second tank, the fluid transfer circuit comprising a first pipe that connects the upper parts of the first and second tanks and which comprises at least one valve and a second pipe that connects the lower part of the first tank to the second tank and which comprises a set of one or more valves for interrupting or authorizing a transfer of a liquid stream of the cryogenic fluid from the first tank to the second tank, and also a pump that comprises an inlet connected to the first tank and an outlet connected to the second tank, the pump and the at least one valve of the first pipe being configured to place the upper parts of the first and second tanks in fluidic communication by opening the at least one valve during a transfer of liquid from the first tank to the second tank by way of the pump, the method ensuring a transfer of cryogenic fluid between the first tank and the second cryogenic tank, and the method includes the steps of: with the at least one valve of the first pipe being closed at the set of valves of the second pipe being initially closed, opening the at least one valve of the first pipe, thereby pressure equalizing the first and second tanks and lowering the pressure of the second tank from the initial pressure thereof and increasing the pressure of the first tank from the initial pressure therefor; and starting the pump and opening the set of valves of the second pipe, thereby transferring the cryogenic fluid in liquid form from the first tank to the second tank.

In optional embodiments of the method for transferring cryogenic fluid:
- said step of starting the pump commences when the lowered pressure of the second tank and the increased pressure of the first tank are between 2 and 8 bar, the lowered pressure being higher than the increased pressure;
- a difference between the increased pressure and the decreased pressure is a determined difference of less than 1 bar;
- the method can include a step of pressurizing the first tank or the second tank using an atmospheric heater when a net positive suction head of the pump becomes insufficient for the transfer of cryogenic fluid from the first tank to the second tank;
- the second pipe connects the lower part of the first tank to the lower part of the second tank; and/or
- the cryogenic fluid is hydrogen.

In addition to the embodiments noted above, the above-described method, system, coupled system, and device may include one or more of the following aspects:
- said pressure-equalization occurs without the use of a compressor or vacuum pump;
- the liquid cryogen is transferred from the liquid cryogen space of the tank to the liquid cryogen space of the vessel without the use of a pressure-building circuit;
- prior to said pressure-equalization, purging the gas transfer conduit and/or the liquid transfer conduit with amounts of gaseous cryogen from the vessel headspace;
- prior to said pressure-equalization and optionally after any purging of the gas and liquid transfer conduits, precooling the gas transfer conduit and/or the liquid transfer conduit with amounts of gaseous cryogen from the vessel headspace;
- prior to said pressure-equalization and optionally after any precooling of the gas and liquid transfer conduits, cooling the gas transfer conduit and/or the liquid transfer conduit with amounts of liquid cryogen from the liquid cryogen space of the tank;
- the first pump compresses the liquid cryogen from the tank to a pressure that is a predetermined value above a pressure of the vessel;
- the predetermined value is less than 3 bar, preferably less than 2 bar, more preferably no more than 1 bar;
- the first pump is a centrifugal pump;
- a second cryogenic liquid pump is operatively associated with the vessel and said second pump and the vessel are adapted and configured to allow the second pump to pump amounts of the liquid cryogen from the liquid cryogen space of the vessel to a point of use at the installation;
- one or more of the gas transfer conduit, the liquid transfer conduit, and the first pump are vacuum jacketed;
- a drive operatively associated with the first pump that is adapted and configured to drive the first pump is vacuum-jacketed or is located external from vacuum jacketing of the first pump;
- the one or more valves of the gas transfer conduit comprises a first valve adjacent to the tank and a second valve adjacent to the vessel, the one or more valves of the liquid transfer conduit comprises a first valve adjacent to the tank and a second valve adjacent to the vessel, and said method further comprises the steps of: stopping operation of the first pump; closing the first and second valves of the gas transfer conduit; closing the first and second valves of the liquid transfer conduit; waiting an amount of time, optionally predetermined, for portions of the gas transfer conduit in between the first and second valves thereof to be warmed by the ambient and portions of the liquid transfer conduit in between the first and second valves thereof to be warmed by the ambient; and after said step of waiting, venting the portions of the gas transfer conduit between the first and second valves thereof of and the portions of the liquid transfer conduit between the first and second valves thereof;
- prior to said step of pumping, the liquid cryogen in the liquid cryogen space of the vessel has an initial temperature higher than an initial temperature of the liquid cryogen in the liquid cryogen space of the tank;
- prior to said step of pumping, the liquid cryogen in the liquid cryogen space of the vessel has an initial saturation temperature; and after performance of said method, the liquid cryogen in the liquid cryogen space of the vessel has a saturation temperature lower than the initial saturation temperature;
- heat is removed from the vessel by performance of said method;
- a coupled system is made up of the tank and vessel connected by the gas and liquid transfer conduits and no heat is added to the coupled system other than through heat leak from ambient and addition of heat from operation of the pump;
- the pressure-equalizations between the headspace of the tank and the headspace of the first vessel and between the headspace of the tank and the headspace of the second vessel occurs without the use of a compressor or vacuum pump;
- the liquid cryogen is transferred from the liquid cryogen space of the tank to the liquid cryogen space of the first vessel and from the liquid cryogen space of the tank to the liquid cryogen space of the second vessel without the use of a pressure-building circuit;
- prior to pressure-equalization between the tank and the first vessel, purging the gas transfer conduit and/or the liquid transfer conduit with amounts of gaseous cryogen from the headspace of the first vessel; and/or prior to pressure-equalization between the tank and the second vessel, purging the gas transfer conduit and/or the liquid transfer conduit with amounts of gaseous cryogen from the headspace of the second vessel;
- prior to pressure-equalization between the tank and the first vessel and optionally after any purging of the gas and liquid transfer conduits between the tank and the first vessel, precooling the gas transfer conduit and/or the liquid transfer conduit with amounts of gaseous cryogen from the headspace of the first vessel; and/or prior to pressure-equalization between the tank and the second vessel and optionally after any purging of the gas and liquid transfer conduits between the tank and the second vessel, precooling the gas transfer conduit and/or the liquid transfer conduit with amounts of gaseous cryogen from the headspace of the second vessel;

prior to pressure-equalization between the tank and the first vessel and optionally after any precooling of the gas and liquid transfer conduits between the tank and the first vessel, cooling the gas transfer conduit and/or the liquid transfer conduit with amounts of liquid cryogen from the liquid cryogen space of the tank;

the first pump compresses the liquid cryogen from the tank to a pressure that is a predetermined value above a pressure of the first vessel, preferably the predetermined value being less than 3 bar, more preferably less than 2 bar, and even more preferably no more than 1 bar;

the first pump compresses the liquid cryogen from the tank to a pressure that is a predetermined value above a pressure of the second vessel, preferably the predetermined value being less than 3 bar, more preferably less than 2 bar, and even more preferably no more than 1 bar;

the first pump is a centrifugal pump;

a second cryogenic liquid pump is operatively associated with the first vessel and said second pump and the first vessel are adapted and configured to allow the second pump to pump amounts of the liquid cryogen from the liquid cryogen space of the first vessel to a point of use at the first installation;

a third cryogenic liquid pump is operatively associated with the second vessel and said third pump and the second vessel are adapted and configured to allow the third pump to pump amounts of the liquid cryogen from the liquid cryogen space of the second vessel to a point of use at the second installation;

one or more of the gas transfer conduit, the liquid transfer conduit, the first pump, and the second pump are vacuum-jacketed;

a drive operatively associated with the first pump that is adapted and configured to drive the first pump is vacuum-jacketed or is located external from vacuum jacketing of the first pump;

the one or more valves of the gas transfer conduit comprises a first valve adjacent to the tank and a second valve adjacent to the first vessel, the one or more valves of the liquid transfer conduit comprises a first valve adjacent to the tank and a second valve adjacent to the first vessel, and said method further comprises the steps of: stopping operation of the first pump; closing the first and second valves of the gas transfer conduit; closing the first and second valves of the liquid transfer conduit; waiting an amount of time, optionally predetermined, for portions of the gas transfer conduit in between the first and second valves thereof to be warmed by the ambient and portions of the liquid transfer conduit in between the first and second valves thereof to be warmed by the ambient; and after said step of waiting, venting the portions of the gas transfer conduit between the first and second valves thereof of and the portions of the liquid transfer conduit between the first and second valves thereof;

one or more valves of the gas transfer conduit comprises a first valve adjacent to the tank and a second valve adjacent to the second vessel, the one or more valves of the liquid transfer conduit comprises a first valve adjacent to the tank and a second valve adjacent to the second vessel, and said method further comprises the steps of: stopping operation of the first pump; closing the first and second valves of the gas transfer conduit; closing the first and second valves of the liquid transfer conduit; waiting an amount of time, optionally predetermined, for portions of the gas transfer conduit in between the first and second valves thereof to be warmed by the ambient and portions of the liquid transfer conduit in between the first and second valves thereof to be warmed by the ambient; and after said step of waiting, venting the portions of the gas transfer conduit between the first and second valves thereof of and the portions of the liquid transfer conduit between the first and second valves thereof;

prior to said step (e), the liquid cryogen in the liquid cryogen space of the first vessel has an initial temperature higher than an initial temperature of the liquid cryogen in the liquid cryogen space of the tank during step (a);

prior to said step (1), the liquid cryogen in the liquid cryogen space of the second vessel has an initial temperature higher than an initial temperature of the liquid cryogen in the liquid cryogen space of the tank during step (h);

prior to said step (a), the liquid cryogen in the liquid cryogen space of the first vessel has an initial saturation temperature; and after performance of said step (e), the liquid cryogen in the liquid cryogen space of the first vessel has a saturation temperature lower than the initial saturation temperature;

prior to said step (h), the liquid cryogen in the liquid cryogen space of the second vessel has an initial saturation temperature; and after performance of said step (1), the liquid cryogen in the liquid cryogen space of the second vessel has a saturation temperature lower than the initial saturation temperature;

heat is removed from the first and second vessels by performance of said method;

a coupled system is made up of the tank and the first vessel connected by the gas and liquid transfer conduits and no heat is added to the coupled system other than through heat leak from ambient;

a coupled system is made up of the tank and the second vessel connected by the gas and liquid transfer conduits and no heat is added to the coupled system other than through heat leak from ambient;

a vent line is disposed in the gas transfer conduit that is in parallel flow communication with the first and second ends thereof and a vent line disposed in the liquid transfer conduit that is in parallel flow communication with the first and second valves thereof, wherein: the gas transfer conduit further comprises a third valve that allows or prevents fluid to be vented from the vent line thereof; the liquid transfer conduit further comprises a third valve that allows or prevents fluid to be vented from the vent line thereof; and the electronic controller is further adapted and configured to open the first valve;

a third pipe connects the upper part of the second tank to the lower part of the first tank, the third pipe comprising a valve;

said step of starting the pump commences when the lowered pressure of the second tank and the increased pressure of the first tank are between 1 and 10 barg, the lowered pressure being higher than the increased pressure;

a difference between the increased pressure and the decreased pressure is a determined difference of less than 1 bar;

pressurizing the first tank or the second tank using an atmospheric heater when a NPSH of the pump becomes insufficient for the transfer of cryogenic fluid from the first tank to the second tank;

the second pipe connects the lower part of the first tank to the lower part of the second tank;

the second pipe connecting the lower part of the first tank to the upper part of the second tank;

the cryogenic fluid is hydrogen;

liquid cryogen from the liquid transfer conduit is sprayed into a headspace of the vessel; and/or use of any of the above-described systems or devices in performance of any of the above-described methods.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein.

DETAILED DESCRIPTION OF THE INVENTION

Figure 1:
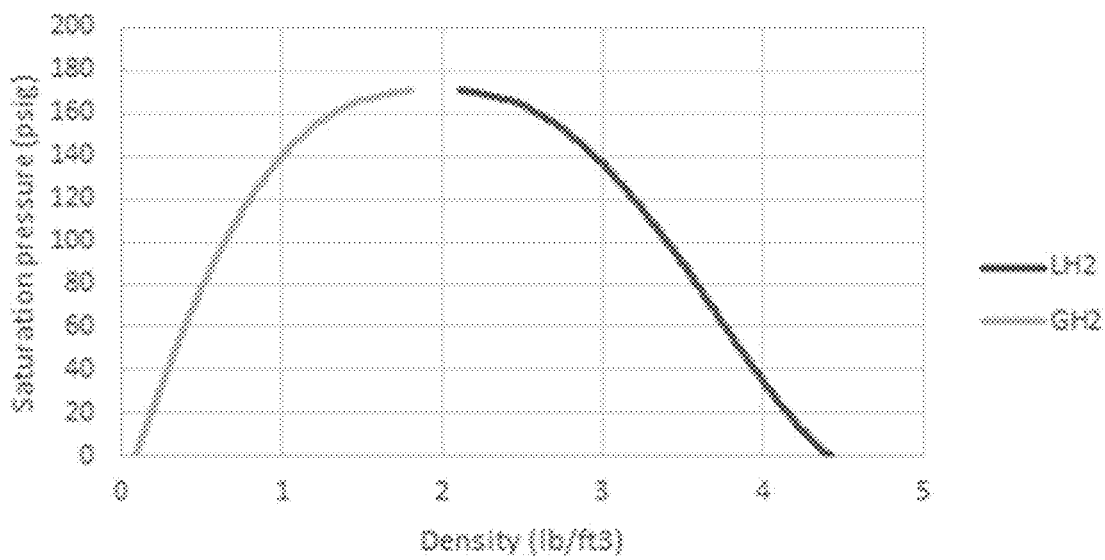
FIG. 1 is a graph of saturation pressure vs density for hydrogen a saturated conditions for both the liquid and vapor portions.
Figure 2:
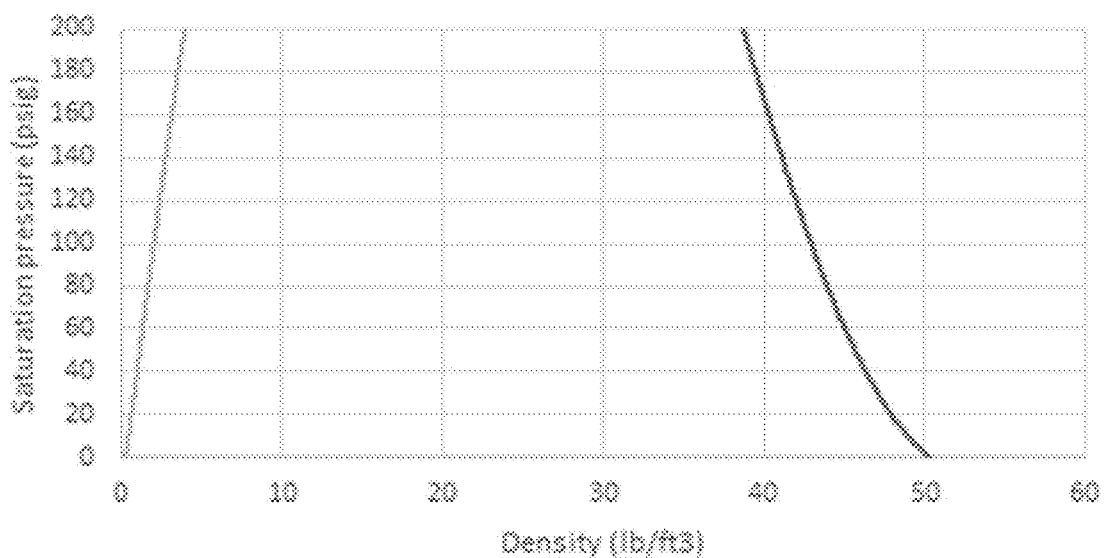
FIG. 2 is a graph of nitrogen density at saturated conditions for the liquid and vapor portions.
Figure 3:
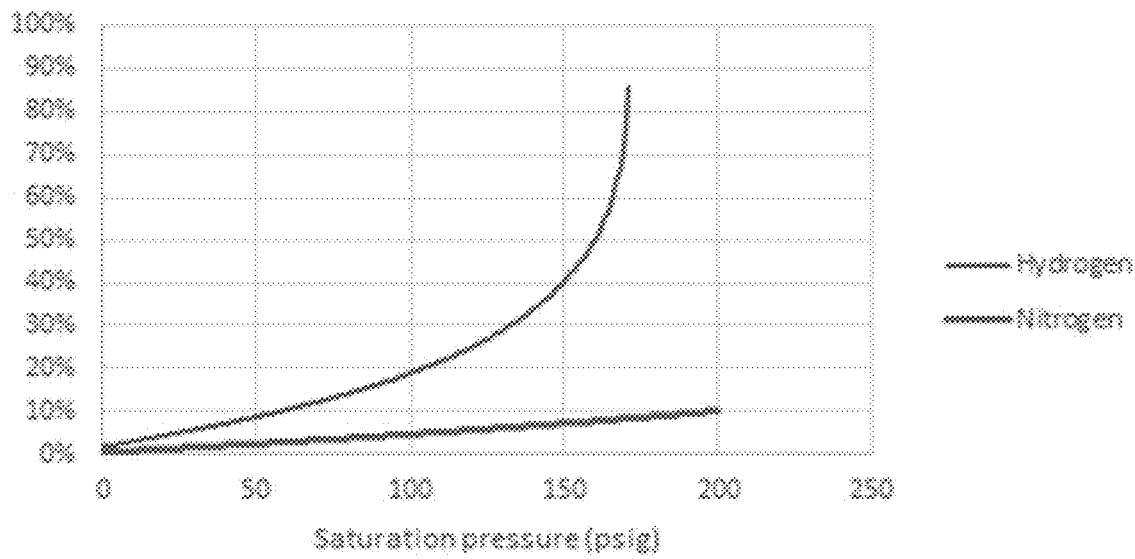
FIG. 3 is a graph of the proportion of vapor density as a portion of liquid density vs saturation pressure for both hydrogen and nitrogen.
Figure 4:
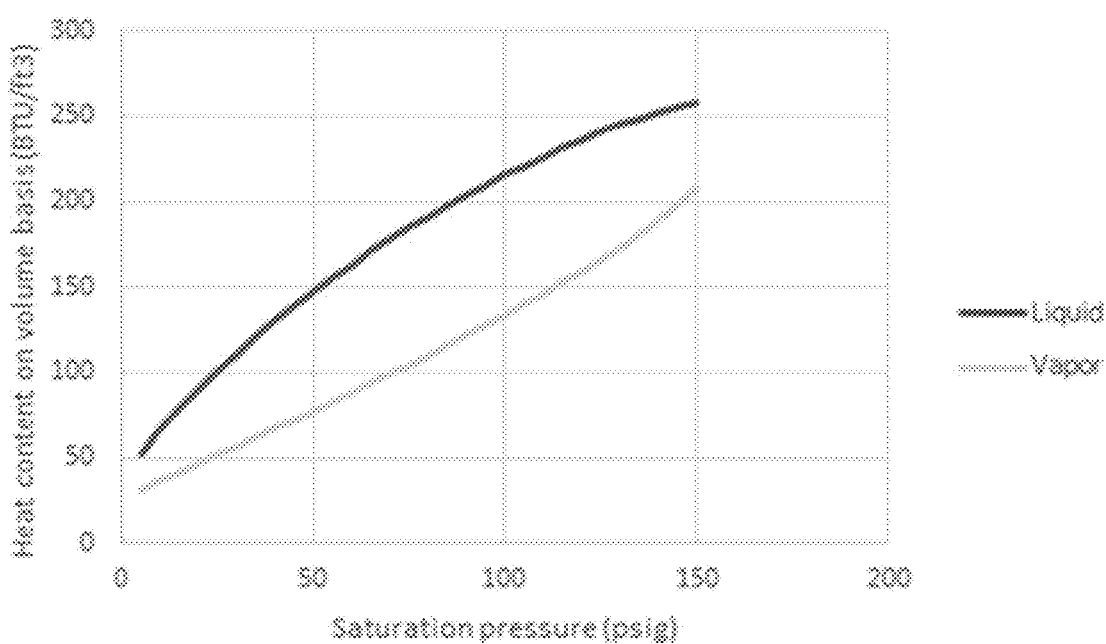
FIG. 4 is a graph of volumetric heat content vs. saturation pressure for both liquid and vapor for hydrogen.
Figure 5:
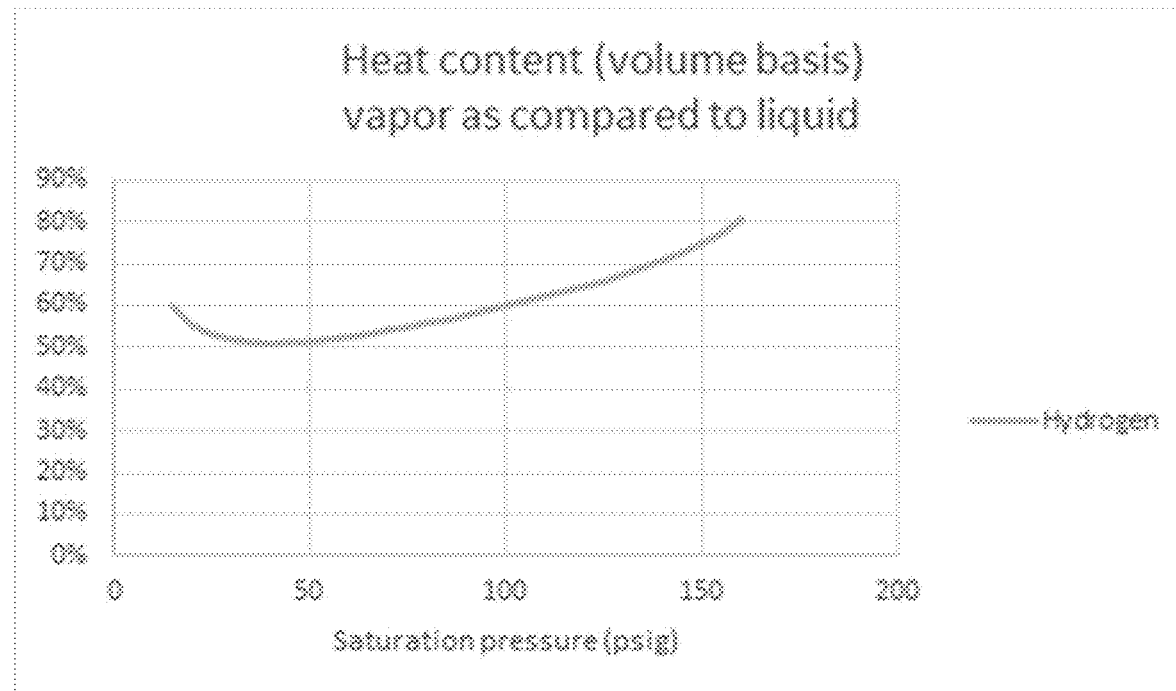
FIG. 5 is a graph of the vapor heat content (as a portion of the liquid heat content) vs saturation pressure for hydrogen.
Figure 6:
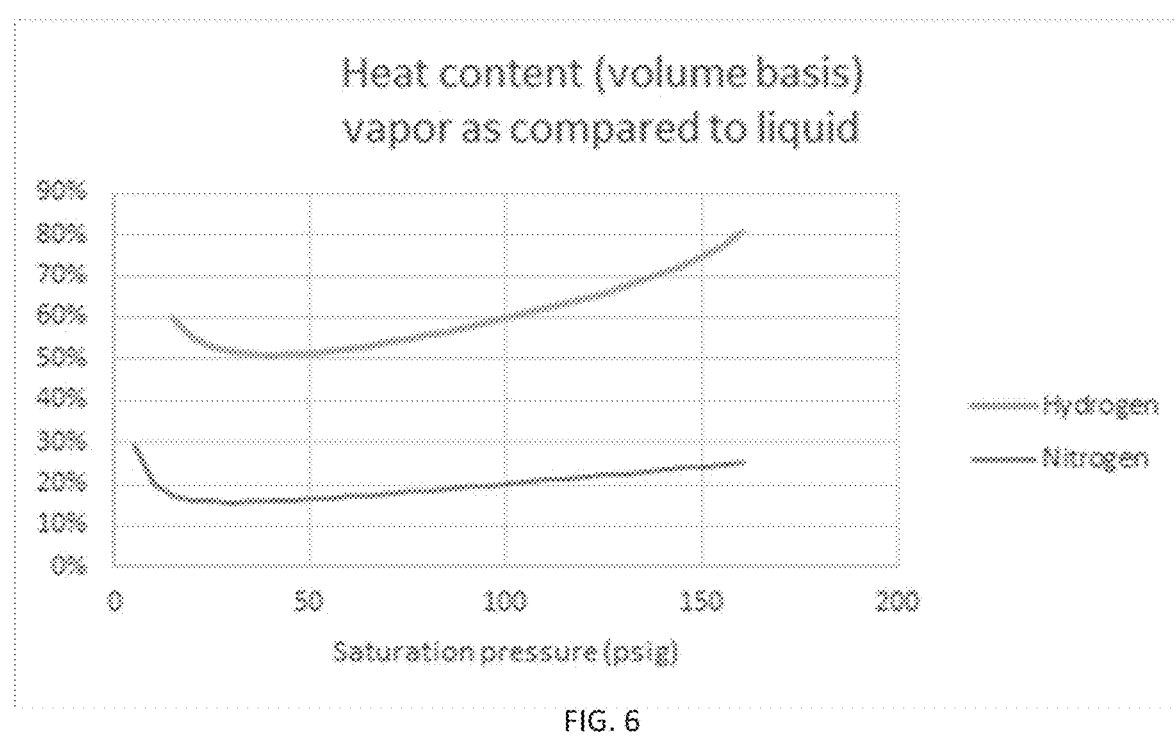
FIG. 6 is a graph of the vapor heat content (as a portion of the liquid heat content) vs saturation pressure for hydrogen and nitrogen.
Figure 7:
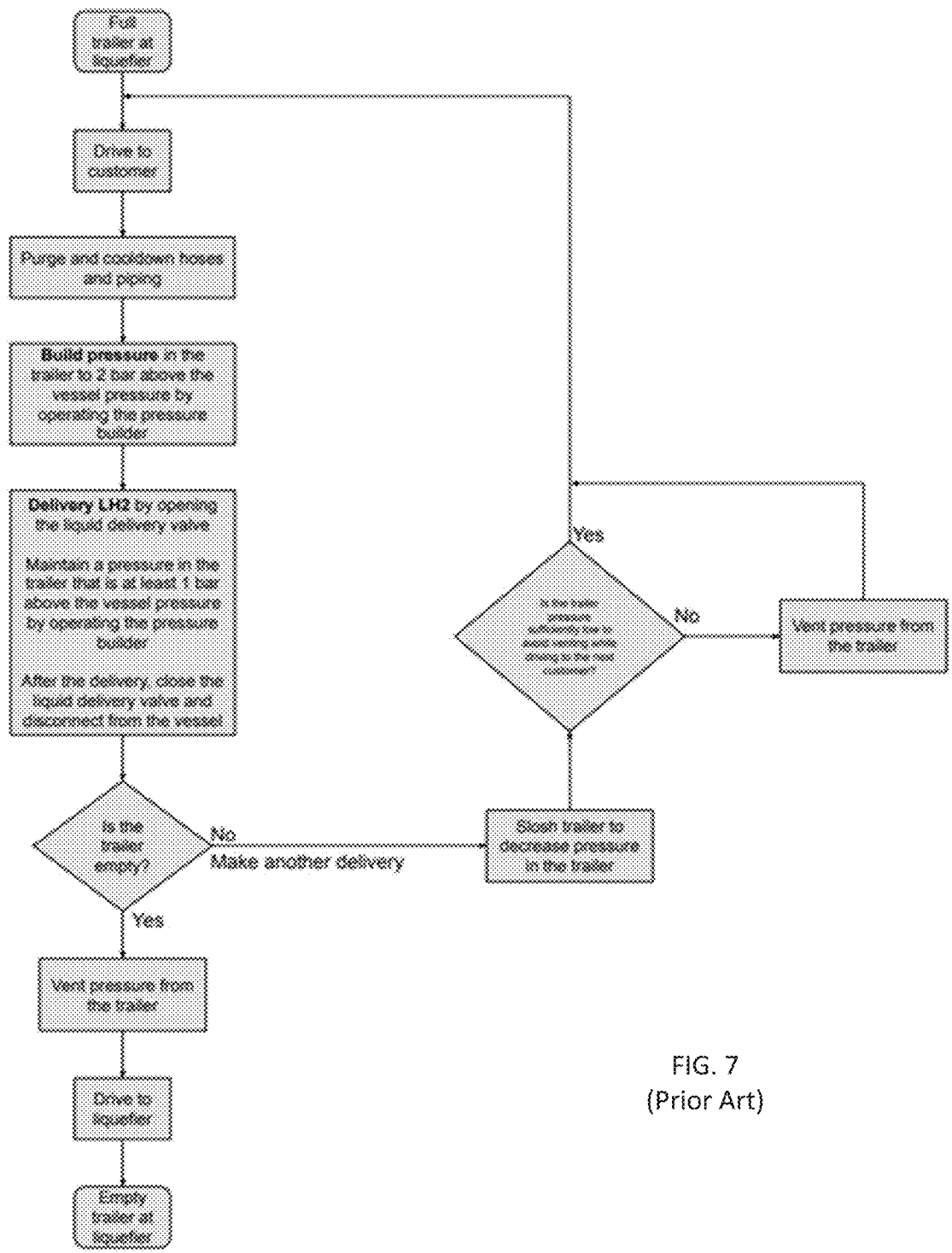
FIG. 7 is a flow chart of a conventional liquid hydrogen supply chain.
Figure 8:
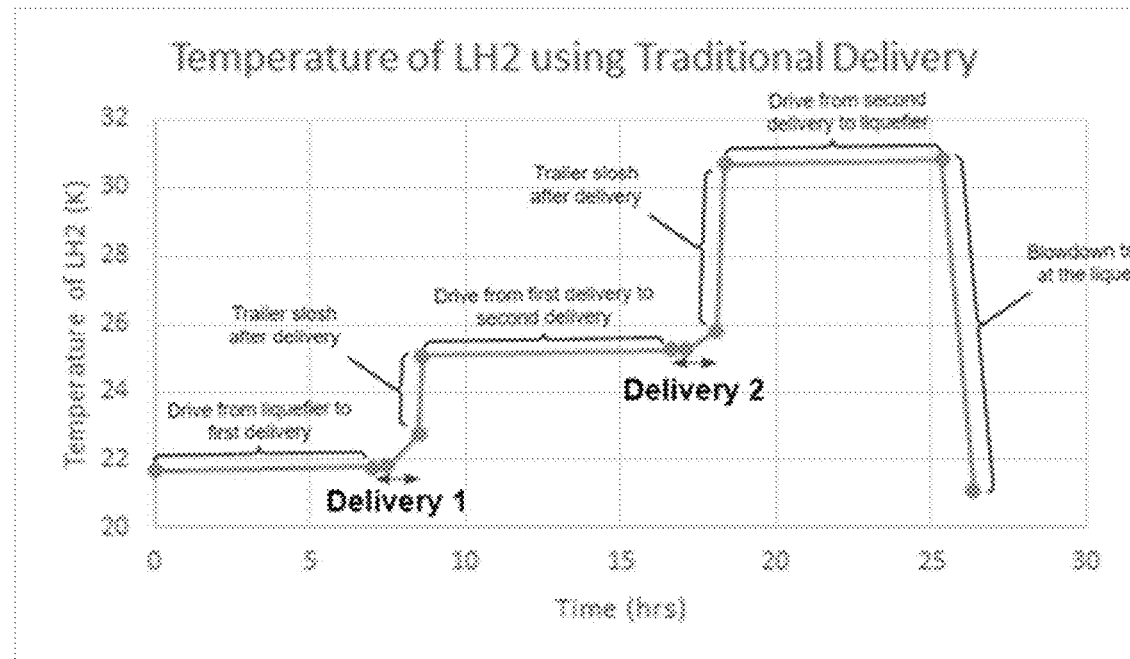
FIG. 8 is a graph of $LH_2$ temperature vs time for a conventional delivery.
Figure 9:
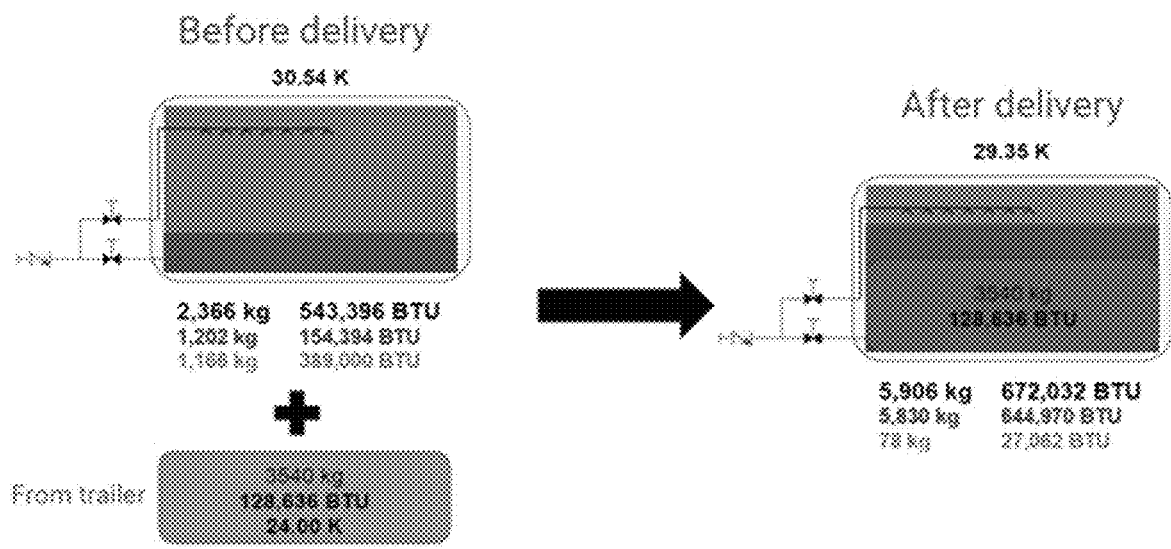
FIG. 9 is a schematic of the heat and mass transfer for a conventional delivery.
Figure 10:
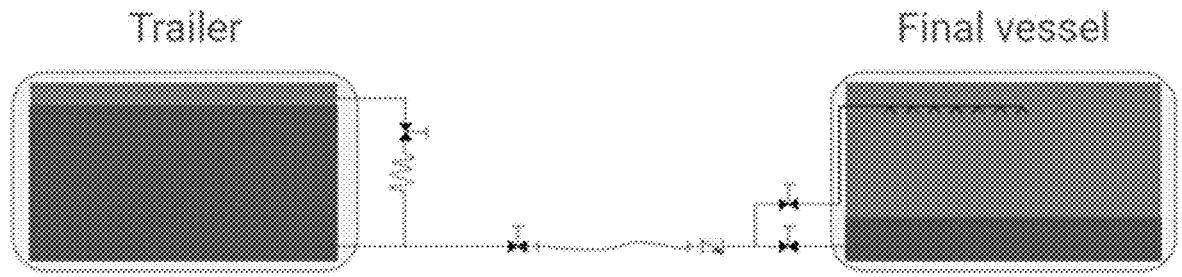
FIG. 10 is a schematic of a conventional liquid hydrogen delivery method.
Figure 11:
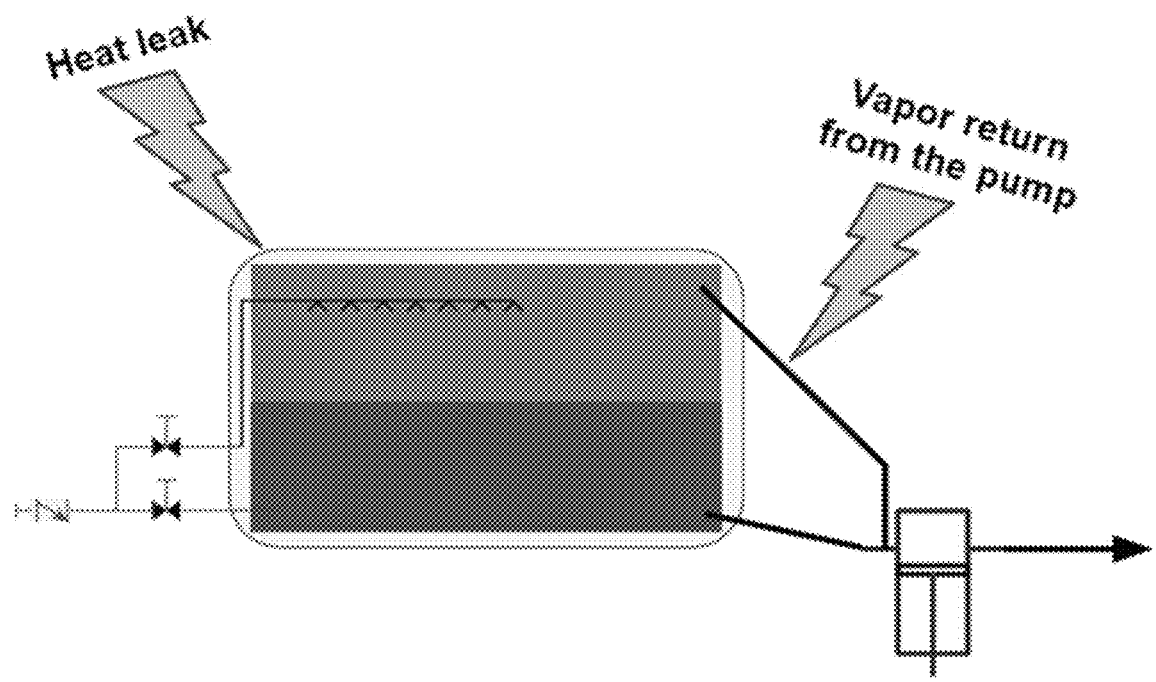
FIG. 11 is a schematic of sources of heat at the final vessel.

A major reason for the challenges described above is that the final vessel accumulates heat from the supply chain and the site operations. The $LH_2$ delivered with the traditional method is warm (high heat content) and causes $LH_2$ in the vessel to be warmer immediately after a delivery. More heat is added by the site operations. All this heat input causes increased amounts of venting, which results in a severe loss of product hydrogen, thereby reducing the operational economics of using hydrogen as a fuel source.

Certain embodiments of the invention propose a method, system, and device that transfers hydrogen from a trailer to a final vessel (from one vessel to another) by allowing pressure to equalize—gas can flow between the final vessel and the trailer—and propelling the $LH_2$ from the trailer to the final vessel with minimal power input to a pump. The combination of these actions results in a final temperature/saturation pressure in the final vessel that is greatly reduced from the traditional delivery method. In addition, the temperature/saturation pressure of $LH_2$ within the trailer after a delivery increases less drastically than when using the traditional delivery method, which allows colder liquid to be delivered to subsequent final vessels.

By allowing gas to transfer from the final vessel to the trailer, the trailer does not need to add gas in order to stay at the appropriate pressure during a delivery. The gas from the final vessel raises the pressure in the trailer to the suitable pressure for delivery, and as liquid leaves the trailer and flows into the final vessel, gas from the final vessel can fill the space evacuated by $LH_2$. The supply of gas from the final vessel uses heat that is already in the system to maintain pressure in the trailer, and no heat from outside the system is added to the trailer (pressure builder).

By allowing gas to transfer from the final vessel to the trailer, heat that has accumulated in the gaseous hydrogen in the final vessel is transferred to the trailer. Because this heat is removed from the final vessel, the final vessel is able to reach a much lower temperature/saturation pressure at the end of the delivery. Because the trailer and the final vessel are equalized throughout the delivery, the pressure in the trailer is also much lower at the end of a delivery. In addition to the equalized lower pressure, the advanced delivery does not require the trailer to be 1-2 bar higher than the final vessel at the end of the delivery. The pressure in the trailer at the end of an advanced delivery is much lower than the pressure in the trailer at the end of a traditional delivery. The lower pressure in the trailer equates to a lower density and heat content of the vapor phase in the trailer. When the trailer sloshes, the $LH_2$ does not absorb nearly as much heat as compared with the traditional delivery method. The lower heat content allows subsequent deliveries of cold $LH_2$.

The pump is only designed to provide the motive force to push liquid into the final vessel. Very little power input is required to push the $LH_2$ from the trailer to the final vessel because the trailer and the final vessel are at the same pressure. In addition, the liquid provided to the pump is subcooled due to the pressure increase in the trailer when the trailer and final vessel are equalized. Subcooled liquid can be pumped efficiently because the pump does not cavitate the liquid during the pumping process.

The subcooling coil proposed one method for removing heat from a final vessel to improve pump performance. The subcooling coil is a slow process that removes heat from the final vessel by expanding $LH_2$ within the vessel to create refrigeration. The cold cryogenic supply chain is another concept to reduce heat in the final vessel by removing vapor from the final vessel for utilization in the trailer. The cold cryogenic supply chain decreases the heat in the final vessel by delivering colder (lower heat content) $LH_2$ into the final vessel and removing vapor, which has a high heat content, from the final vessel and sending this vapor to the trailer. The lower heat content in the final vessel after a delivery will improve pump performance and improve efficiency of the site by providing $LH_2$ that has more capacity to accept heat.

Delivery Equipment

Figure 12:
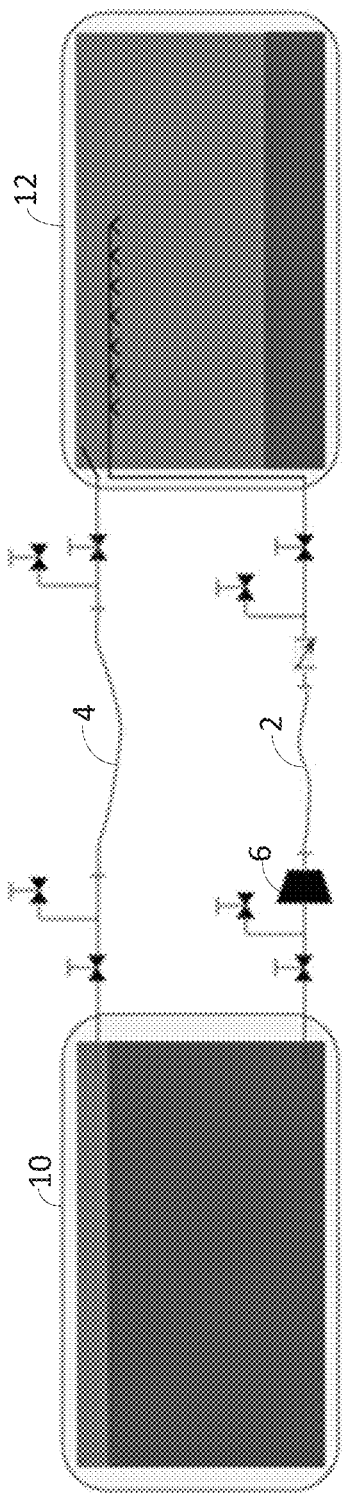
FIG. 12 is a schematic of an embodiment of the invention.

FIG. 12 provides a first embodiment for the advanced delivery device and method. This embodiment can include a liquid hose 2, a gas hose 4, and a centrifugal pump 6. A pressure builder is preferably not used. The liquid hose 2 connects the bottom of the trailer 10 to the final vessel 20. The gas hose 4 connects the top of the trailer 12 to the top of the final vessel 10. The centrifugal pump 6 can be placed anywhere along the liquid line 2: it can be placed on/in the trailer or at the site.

In a preferred embodiment, all parts of the process are insulated to minimize heat leak from ambient to the cryogenic liquid. For example, process lines and hoses can be vacuum jacketed including the gas hose and gas piping. The pump can be vacuum jacketed, and the drive can be installed within the vacuum jacket or the drive can be external to the cryogenic system with a method to reduce heat leak.

In certain embodiments, the pump is designed to only provide head to overcome resistance from the piping (1-2 bar of head). Due to the small amount of head provided by the pump, the pump inputs minimal power into the fluid and introduces little heat from inefficiency of the pump. Also, the pump can be designed to fit in a small footprint.

Delivery Process

In certain embodiments, the delivery can include several major steps: connecting, purging and cool down, pumping to deliver $LH_2$, and disconnecting. First, the liquid hose 2 and the gas hose 4 (both vacuum jacketed) are connected from the trailer 10 to the final vessel 12. Next, the hoses are purged with a flow of warm $GH_2$ from the vapor space of the final vessel 12. Next, the hoses are purged with several pressure pulses of $GH_2$ from the vapor space of the final vessel. After purging, gaseous hydrogen from the final vessel 12 is circulated through the piping and hoses to cool the system. Next, a small amount of liquid hydrogen from the trailer 10 flows through the pump 6 and liquid hose 2 to achieve the final cooling. For the advanced delivery, gaseous hydrogen from the final vessel 12 is used for most of the purging and cool down steps instead of gaseous hydrogen from the trailer 10. The gas in the final vessel 12 has the highest heat content as compared to the other fluids in the system.

After purging and cool down, the valves around the gas hose 4 are opened to allow the trailer and the final vessel to equalize. Next, the valves around the liquid hose 2 are opened to allow communication between the liquid phase of the trailer and the final vessel. Next, the pump 6 is turned on, and liquid begins to flow from the trailer 10 to the final vessel 12. While liquid is flowing from the trailer 10 to the final vessel 12, gas hydrogen flows from the final vessel back to the trailer via gas hose 4.

After the delivery, the hoses are warmed using GH2 from the vessel 12 that has been heated in a heater, which can be heated by ambient conditions, and then the hoses are disconnected. The driver does not need to decrease pressure in the trailer 10 because the pressure is within an acceptable range for driving. As the trailer is hauled down the road, the fluid will naturally slosh and the vapor and liquid will mix and reach thermodynamic equilibrium.

Detailed Delivery Equipment and Process

Figure 13:
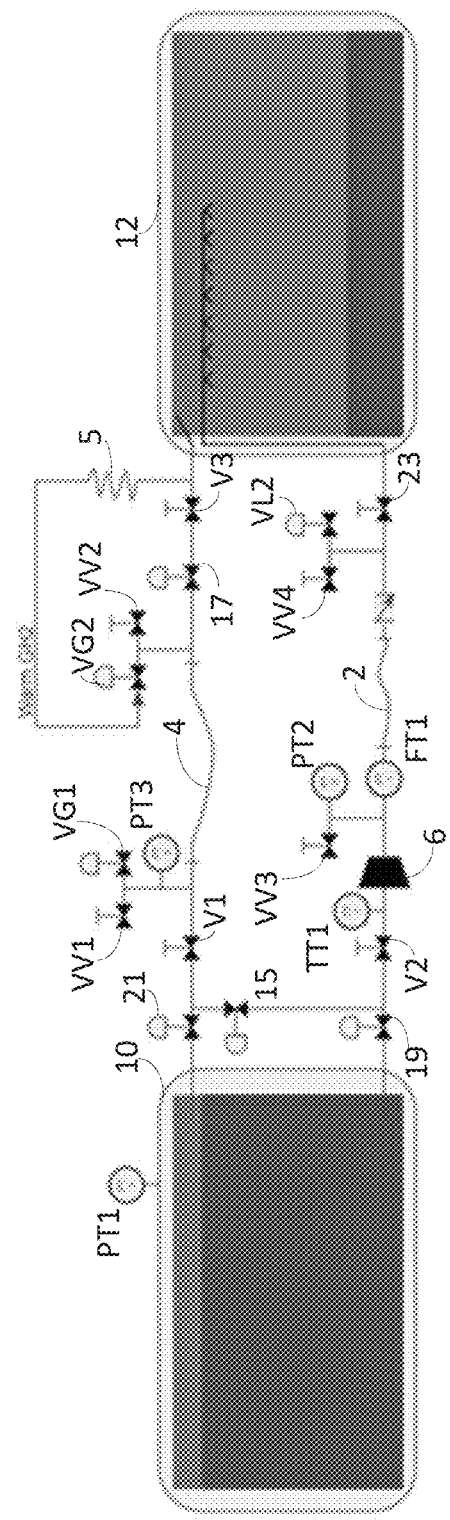
FIG. 13 is a schematic of another embodiment of the invention utilizing automated control.

The delivery can take place as a simple system as shown in FIG. 12. However, those of ordinary skill in the art will understand that additional complexities can be included to improve the overall concept. For example, FIG. 13 provides an embodiment that is an improvement over the embodiment shown in FIG. 12. In this embodiment, the concept for the actual implementation of the advanced delivery method is more complex with additional steps and can include an automated delivery. The delivery process can be automated with a controller that operates valves and the pump and monitors many sensors. Automation will make the delivery safer and faster by reducing tasks for the driver.

In the embodiment shown, the delivery steps can include:
all valves should start in the closed position;
open vent valves VV1 and VV2, and then connect gas hose 4;
close vent valves VV1 and VV2;
open vent valves VV3 and VV4, and then connect liquid hose 2;
close vent valves VV3 and VV4;
purge gas hose 4 by opening valves VG1 and VG2, this will allow for gas flow from vessel 12 up through heater 5, through VG2, then line 4 before venting out VG1;
close VG1 and VG2;
open manual flow valves V1 and V2 on trailer and confirm that liquid hose holds pressure,
begin purging liquid line 2 by opening bypass valve 15, along with VG2 and VL2;
close valves 15, VG2, and VL2;
open manual vessel gas valve V3 (along with valves V1 and V2) and instruct controller to cooldown system;
system cooldown includes:
  cooldown of hoses and pump using $GH_2$ from vessel 12, which includes automatic opening of valve 15, valve 17, and valve VL2;
  cooldown of pump with LH2 from tank 10 by closing valve 15, opening valve 19, and opening valve 21 (valves V3, 17, V2, and VL2 also remain open), with valve 21 open, the gas can balance between vessel 12 and tank 10;
once cooldown is complete, valve VL2 is closed, and then fill valve 23 is opened;
PLC command to start pump 6;
Filling vessel while pump 6 is still running, gas flows via V3 through 4 to top of tank 10, which keeps the pressures of the two tanks similar, while pump 6 provides head to push liquid hydrogen from tank 10 to vessel 12;
After vessel 12 is filled, pump 6 is stopped and vessel valves 23 and V3, along with valve 19 are closed;
Hoses are warmed and pressure in hoses is vented
  To warm—open valves 21, 15, V2, V1, and 17, while all other valves are in the closed position, before opening valve VG2 and valve VL2 (this allows gaseous H2 from vessel 12 to be warmed in heater 5 before traveling to remaining conduits);
  To vent—close valve VG2 (which stops $GH_2$ from vessel 12) such that the remaining gas vents out VL2;
Hose removal—
  all valves closed except for valves V1, V2 and VL2, which are open;
  close trailer valves V1 and V2;
  vent liquid hose by opening vent valve VV4 and then disconnect liquid hose 2;
  vent gas hose by opening vent valve VV2 and then disconnect gas hose 4;
PLC confirm hoses are disconnected
In a preferred embodiment, the PLC commands can include the steps of:

Once hoses are connected, purge gas hose;

Once manual valves on the trailer are open, purge the LH$_2$ hose;

Once gas valve on the vessel is open, cooldown and gas balance;

Once fill valve is open on the vessel, start the pump;

Once fill is complete, stop the pump;

Once manual valves are closed on the tank, hoses are warmed and pressure vented on the hoses; and Confirm hoses are disconnect.

In a further embodiment, the method and apparatus can include additional details, which are outlined below:

GH$_2$ Hose Purging

Open the warm GH$_2$ supply valve VG2 for a short, specified period. The pressure on PT3 should be greater than a specified pressure. Preferably, allow a specified time for the pressure to settle. Next monitor the pressure, and if the pressure does not decay less than a specified amount in a specified period, the GH$_2$ hose is not leaking. Open the gas return vent valve VG1 until the pressure decreases below a specified pressure. If the pressure decreases as expected then the vent valve is functioning.

Flow purge by opening the warm GH$_2$ supply valve VG2 and the gas return vent valve VG1 on the trailer. Purge continues until timer expires.

Pressure purge: Open the warm GH$_2$ supply valve until the hose meets a specified pressure. Close the warm GH$_2$ supply valve. Open the gas return vent valve on the trailer until the pressure is below a specified pressure. Close gas return vent valve. Repeat for a specified count.

LH$_2$ Hose Purging

Open the warm GH$_2$ supply valve VG2 for a short, specified period. The pressure on PT1 and PT3 should be greater than a specified pressure. Allow a specified time for the pressure to settle. Next monitor the pressure, and if the pressure does not decay less than a specified amount in a specified period, the LH$_2$ hose 2 is not leaking. Open the LH$_2$ hose vent valve VL2 until the pressure decreases below a specified pressure. If the pressure decreases as expected then the vent valve is functioning.

Flow purge by opening the warm GH$_2$ supply valve VG2 on the final vessel, the crossover valve 15 on the trailer, and the LH$_2$ hose vent valve VL2 on the final vessel. Purge continues until timer expires.

Pressure purge by opening the warm GH$_2$ supply valve until the hose meets a specified pressure. Open the LH$_2$ hose vent valve VL2 on the final vessel until the pressure is below a specified pressure. Repeat for a specified count.

GH$_2$ Cool Down

Open GH$_2$ valve V3 on the final vessel, crossover valve on the trailer 15, and LH$_2$ hose vent valve VL2 on the final vessel.

Option 1: Cool down for a specified time. If TT1 is less than a specified temperature at the end of the timer, continue to the next step.

Option 2: Cool down until TT1 reaches a specified temperature. (Show a warning if the cool down exceeds a specified time.) Continue to the next step.

Equalization and LH2 Cool Down

Open the GH$_2$ valve 21 on the trailer and the GH$_2$ valve 17 on the final vessel so that the final vessel and the trailer can equalize.

Option 1: Open the LH$_2$ valve 19 on the trailer and the LH$_2$ hose vent valve VL2 on the final vessel for a specified time. If TT1 is less than a specified temperature at the end of the timer, continue to the next step.

Option 2: Open the LH$_2$ valve on the trailer and the LH$_2$ hose vent valve on the final vessel until TT1 reaches a specified temperature. (Show a warning if the cool down exceeds a specified time.) Continue to the next step.

Pump Permissive to Start

If TT1 is less than a specified temperature, the pump 6 can start.

Running the Pump

While running the pump, several sensors are monitored to determine if there is a problem. The temperature at the pump TT1 should remain below a specified value or the pump will stop. Beginning at a specified period after startup, the differential pressure between PT1 and PT2 must be greater than a specified value or the pump will stop. Beginning at a specified period after startup, the flow rate FT1 through the pump should be greater than a specified value or the pump will stop.

If the level in the final vessel level meets/exceeds the maximum level, then the pump is stopped.

Stop the Pump

At pump stop, turn off the pump. After a specified period, close the LH$_2$ valve 19 on the trailer and open the crossover valve 15 on the trailer.

Warm Hoses

Open the warm gas valve on the final vessel, the crossover valve on the trailer, and the LH$_2$ vent valve on the final vessel.

Option 1: Allow warm up for a specified time. If TT1 is greater than a specified temperature at the end of the timer, continue to the next step.

Option 2: Warm up until TT1 is greater than a specified temperature. (Show a warning if the warm up exceeds a specified time.) Continue to the next step.

Vent Hoses

Open the crossover valve on the trailer and the LH$_2$ vent valve on the final vessel for a specified period. If the PT2 and PT3 are less than a specified value, continue to the next step.

In certain embodiments, the controller (PLC) will preferably communicate with the final vessel 12 for the following points:

Operation of the warm GH$_2$ valve VG2 on the final vessel,

Operation of the GH$_2$ valve 17 on the final vessel,

Operation of the LH$_2$ hose vent valve VL2 on the final vessel,

Tank level so that the trailer knows when the final vessel is full and the pump can be stopped, Emergency stop conditions activated by the site and sent to the trailer, and Emergency stop activated by the trailer and sent to the site.

Communication between the trailer 10 and the final vessel 12 can be through several methods: pneumatic signal, electronic signal (24V on/off), communication protocol, or other means.

An automated delivery improves safety of the delivery by removing human factors that may lead to error, by performing a leak check on the hoses, and by warming the hoses after the delivery. An automated delivery also minimizes the amount of venting by precisely controlling the amount of hydrogen used for purging, cool down and warm up steps instead of using rules of thumb that are typical for the traditional delivery method. Finally, an automated delivery reduces the duration of a delivery because the controller automatically conducts the purging, cool down and warm up steps. As compared to the traditional delivery method, the advanced delivery method decreases the delivery duration by avoiding the time needed to pressure build at the start of the delivery and avoiding time for the $LH_2$ hose to warm by natural heat leak after the delivery. Additionally the advanced delivery will not require the trailer to be vented after a delivery because the pressure in the trailer will be quite low as compared to a traditional delivery.

Warming the hoses improves safety of the delivery by ensuring that there is no $LH_2$ in the hose when it is disconnected. The warming step also improves the quality assurance by reducing the likelihood that impurities such as water will condense/solidify in the corrugations of the cold hose.

The device and/or method disclosed in U.S. patent application Ser. No. 17/322,441, filed May 17, 2021, and whose contents are incorporated herein by reference, may be used in performance of the invention. Those skilled in the art will recognize that the cryogen storage vessel or trailer of described in the instant Specification corresponds to the first tank of the '441 Application and the cryogen storage vessel or final vessel described in the instant Specification corresponds to the second tank of the '441 Application.

Heat in the Trailer

During the advanced delivery, gas flows from the final vessel to the trailer. First, the gas flows from the final vessel to the trailer in order to equalize the pressure between the vessels. Once the pump starts transferring $LH_2$, more gas flows from the final vessel to the trailer to fill the space that is evacuated as the $LH_2$ flows into the final vessel. With the final vessel as the source for gas, there is no need to pressure build (add heat) during the delivery to create gas and maintain a specific pressure within the trailer. The fluid communication between the final vessel and the trailer ensures that the vessels are equalized throughout the delivery.

Along with the mass transfer of vapor, the heat content of this vapor moves from the final vessel into the trailer. Because heat is removed from the final vessel, the saturation pressure in the final vessel after a delivery is much lower than a delivery from the traditional supply chain. The lower saturation pressure/temperature in the final vessel results in a lower pressure in the vapor space of the trailer and a smaller heat content in the vapor space of the trailer. When the trailer is sloshed after the delivery, much less heat is added to the $LH_2$ that remains in the trailer.

Figure 14:
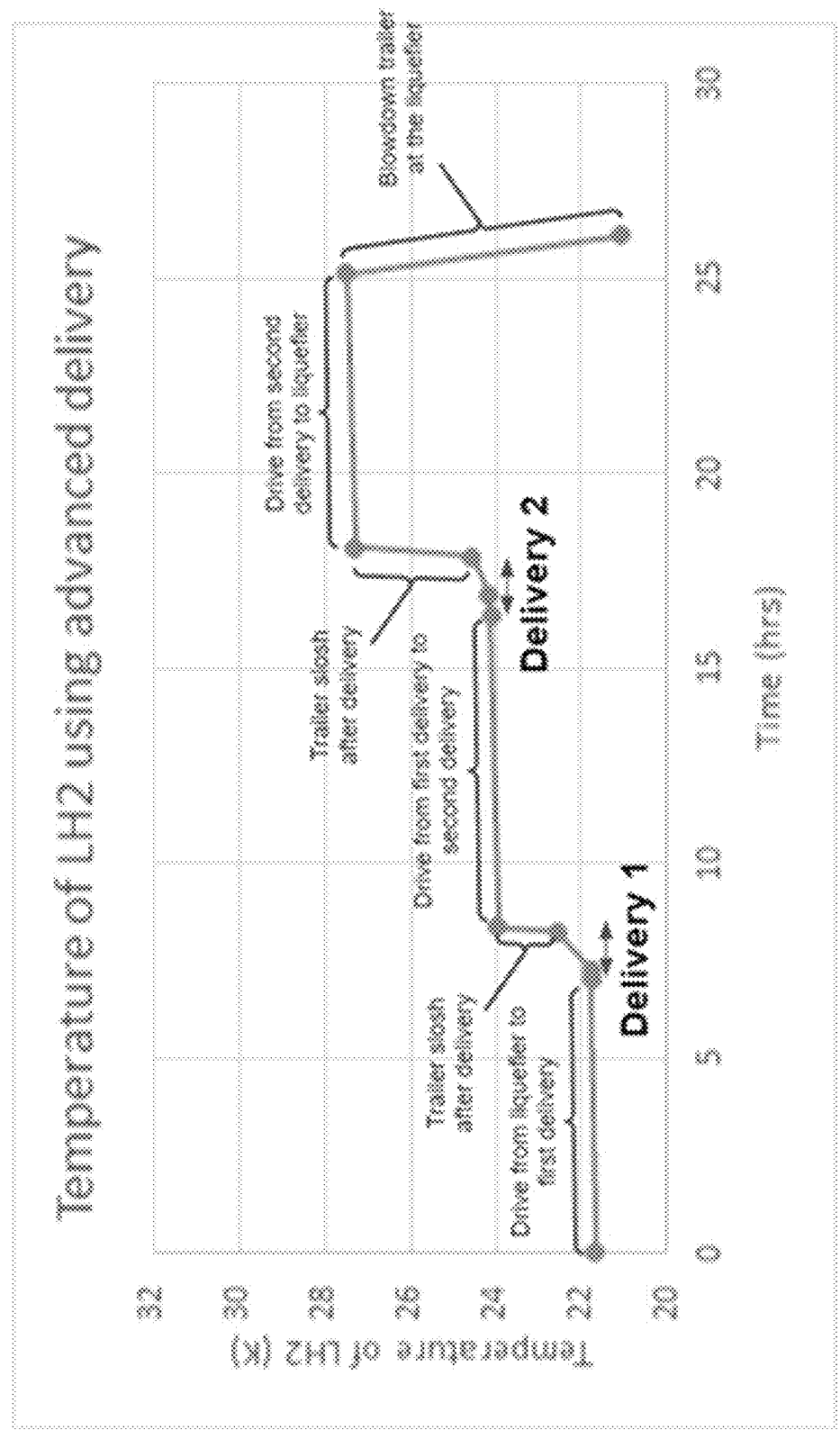
FIG. 14 is a graph of $LH_2$ temperature vs time for subsequent deliveries according to an embodiment of the invention.

FIG. 14 provides a graphical representation showing temperature of $LH_2$ as a function of time in accordance with an embodiment of the present invention.

With the advanced delivery, the temperature of the $LH_2$ warms by 2.3 K (16.2 psi saturation pressure) after the first delivery to a typical vessel (120 psig operating pressure). With the smaller increase in temperature, the advanced delivery is able to transfer colder liquid to subsequent deliveries, and the average temperature of a delivery is 23.2 K (22.2 K for the first delivery and 24.2 K for the second delivery). When more deliveries are made, the effect of colder $LH_2$ is more noticeable as compared to the traditional delivery method.

Heat in the Final Vessel During a Delivery

The amount of heat in the final vessel after a delivery is based on the amount of heat in the final vessel before the delivery and the heat content of the $LH_2$ delivered to the final vessel. The interaction of heat and mass during the advanced delivery process will be explored further in this section.

Prior to a delivery, the final vessel is usually at or near the maximum operating pressure due to the large amount of heat introduced to the final vessel during operation. When a trailer arrives, the trailer will have $LH_2$ that is at a colder condition than $LH_2$ delivered by the traditional delivery. In addition, the advanced delivery process will ensure the lowest heat content in the final vessel at the end of the delivery.

As is typical, the driver will fill from the top of the final vessel. As the liquid flows into the final vessel, it mixes with the gaseous hydrogen in the vessel and the contents of the final vessel reach equilibrium. In addition, the gas transferred from the top of the final vessel back to the trailer is in equilibrium with the final vessel contents. Because the trailer accepted some of the vapor from the final vessel, heat was removed from the final vessel, and heat from this vapor does not have to be absorbed by the cold liquid coming into the final vessel. The final heat content in the final vessel is much lower than the traditional delivery.

Figure 15:
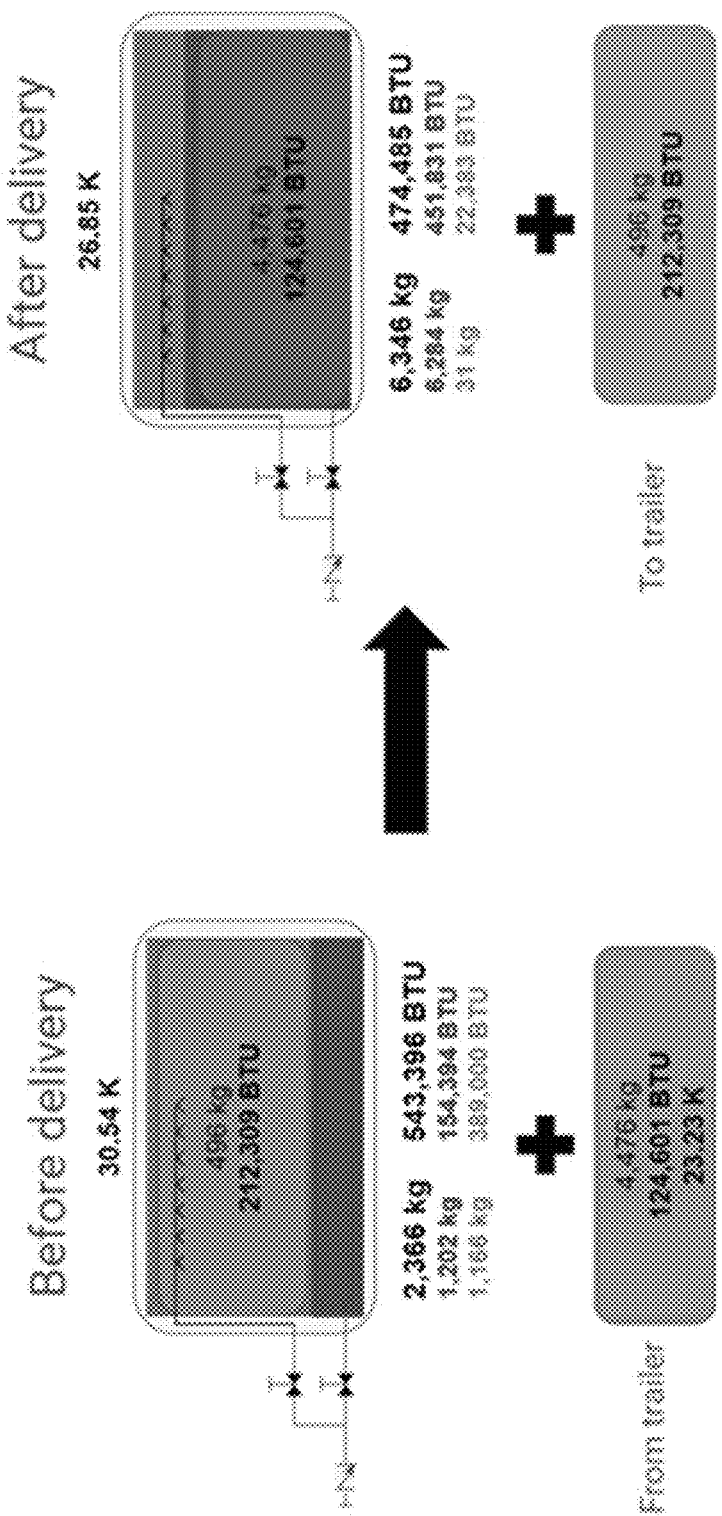
FIG. 15 is a schematic of the heat and mass transfer for an embodiment of the invention.

FIG. 15 provides simulation results of heat and mass transferred to the final vessel in accordance with an embodiment of the present invention. The cold cryogenic supply chain ensures that all final vessels achieve a low heat content. Due to the improved condition, the final vessel can absorb substantially more heat before venting occurs.

Heat in the Final Vessel after a Delivery

Now that the heat content in the final vessel is low, the final vessel can absorb substantially more heat before venting occurs. Additionally, the pump performs better with cold liquid because the liquid at the pump can absorb more heat before vaporizing which allows heat to be rejected out the discharge of the pump instead of immediately vaporizing and sending the vapor back to the vessel. The combination of the low initial heat content and the improved pump performance result in much lower losses at the site.

Supply Chain

A cold cryogenic supply chain improves the distribution and delivery of molecules and improves the yield of product through the final vessel. This is a unique system to minimize heat input and preserve refrigeration.

In certain embodiments of the present invention, most, preferably all, of the $LH_2$ that is in the trailer is transferred to the final vessel. After the $LH_2$ molecules are transferred to the final vessel, the final vessel adds heat through its normal operation. When a trailer returns for another delivery, the heat and mass of the gas phase of the final vessel is transferred to the trailer. Due to certain embodiments of the present invention, much more hydrogen is transferred from the trailer to the final vessel. In addition, much more hydrogen is transferred from the final vessel to the end use (dispensed). In total, significantly more of the hydrogen that enters the supply chain can be dispensed.

Preserving Refrigeration of a Cold Cryogenic Supply Chain

The supply chain functions as a conduit for refrigeration as well as molecule transfer. The only significant heat input is added by the pump in the final vessel. (Other inputs such as natural heat leak and the transfer pump are miniscule.) The heat input from the pump in the final vessel generates gas. When the trailer arrives for a delivery, the trailer takes the heat and mass of gas molecules from the final vessel and transports it back to the liquefier. By implementing a system that avoids heat input, the supply chain that functions to transport refrigeration to the final vessel, which is the heat source, instead of the traditional supply chain that functions primarily to transport molecules with little regard to the refrigeration of the supply chain.

In order to preserve the cold of the cryogenic liquid, all designs and processes avoid adding heat. Heat is not added by the pressure builder. Heat is not added by pumping to unnecessary pressure (adding extra work to the fluid). Heat leak is minimized with vacuum insulation. All the heat of the vapor in the final vessel is not absorbed by incoming liquid because some of the vapor is provided to the trailer. Also cold is not wasted for cool down or purging. The cold conservation allows more cold product to be delivered to final vessels. All final vessels receive cold liquid.

Instead of adding heat to create pressure, certain embodiments of the present invention use heat that is already in the supply chain to balance pressure and fill the trailer. This prevents additional heat from being added and leading to losses in the supply chain.

Benefits of a cold cryogenic supply chain is that it provides more value for each molecule delivered to the final vessel because the cryogenic liquid has the ability to receive more heat before vaporizing. In addition, a cold cryogenic supply chain is more efficient at transferring molecules from the trailer to the final vessel. Because minimal heat is added to the trailer at each delivery, the cryogenic liquid in the trailer remains cold and all LH$_2$ delivered to the final vessel is cold. Because of the cold incoming liquid and the removal of heat from the final vessel, the final vessel is much colder after the delivery.

In optional embodiments:
 Addition of a check valve in the gas line to only allow vapor to flow from the final vessel to the trailer. The check valve would prevent gas from flowing backward from the trailer to the final vessel.
 Addition of analysis for the vapor flowing from the final vessel to the trailer to prevent contamination. Analysis can be as simple as a passive device that activates (changes color for example) when an impurity is detected.

Advantages of Certain Embodiments of the Present Invention

Those of ordinary skill in the art will readily recognize that certain embodiments of the present invention provide many distinct advantages, such as:

Introduction of heat into the tanker and the final vessel is minimized since the gaseous cryogen from the final vessel is used to decrease the initial pressure imbalance between the tanker and the final vessel. Since the pump does not need to overcome a significant pressure difference between the tanker and the final vessel, the pump does not have to be operated at significant head and thus adds little heat to the coupled system. Indeed, the pump provides only a small pressure differential (e.g., only a few bar or as little as 1-2 bar). Because introduction of heat into the either the tanker and the final vessel is minimized, boil-off loss in each of the tanker and the final vessel is similarly minimized. The gaseous cryogen in the final vessel headspace is put to profitable use and not vented.

For a given amount of liquid cryogen dispensed to the tanker of the liquid cryogen production facility, more of the liquid cryogen is transferred to the final vessel (or in the case of multiple deliveries with a single tanker, multiple final vessels). This is because none of the high quality, low-temperature, low-saturation pressure cryogenic liquid from the tanker is used to perform purging and pre-cooling. More importantly, none of this higher quality liquid cryogen is consumed in a pressure building circuit.

The quality of the molecules delivered by the tanker to the final vessel is improved because performance of the invention removes heat from the final vessel and lowers its saturation temperature. This is important because a lower saturation temperature provides for a greater buffer of heating of the cryogenic liquid over time in the final vessel before it must be vented or before an efficiency of a pump associated with the final vessel is degraded. In contrast, heat is actually added to the final vessel during a delivery according to conventional techniques.

The quality of the molecules remaining in the tanker after a first delivery and fill is improved. Because less heat is added to the tanker in performance of the invention in comparison to conventional techniques utilizing a pressure building circuit, the temperature and saturation temperature of the liquid cryogen remaining in the tanker following the first delivery is lower in comparison to the same liquid cryogen remaining in the tanker following a first delivery according to the conventional technique. This effect is additive as the same tanker is used to subsequently fill other final vessels. Thus, multiple deliveries with a single tanker are more efficient.

The overall fill time realized in performance of the invention is decreased in comparison to final vessel fills utilizing conventional techniques. This is because the invention does not require the lengthy period of time necessary to build pressure in the tanker using a pressure building circuit.

Certain embodiments of the invention allow for a possible increase in the transfer flow rate while at the same time maintaining relatively stable pumping conditions. In addition, the transfer flow rates can be independent of the weather conditions. Certain embodiments also substantially reduce or eliminate the cryogenic cloud and the condensation of liquid oxygen under the tanker.

In addition, the procedures for the delivery operators are simplified.

In comparison to conventional techniques, the tanker and the final vessel are at relatively lower pressures during a fill. This potentially makes it possible to reduce the mechanical size constraints (saving in terms of weight, material, cooling time and cost).

It is thus no longer necessary to equip the tanker with pressure building circuit.

The electrical consumption of the liquid cryogen pump in the liquid transfer line is markedly lower than the electrical consumption of a gas compressor that could be used on the gas transfer line utilized by a prior art technique. This is notable since the pressure and especially temperature at the inlet of a compressor are much more variable than those at the inlet of a liquid cryogen pump.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A method for transferring cryogenic fluid using a device for transferring cryogenic fluid, wherein the device comprises a first tank configured to distribute a cryogenic fluid and to store a cryogenic fluid in liquid phase in a lower part therein and in gaseous phase in an upper part therein at an initial pressure, a second tank configured to accommodate the cryogenic fluid from the first tank in liquid phase in a lower part therein and in gaseous phase in an upper part therein at a second initial pressure, and a fluid transfer circuit connecting the first and the second tank, the fluid transfer circuit comprising a first pipe that connects the upper parts of the first and second tanks and which comprises at least one valve and a second pipe that connects the lower part of the first tank to the second tank and which comprises a set of one or more valves for interrupting or authorizing a transfer of a liquid stream of the cryogenic fluid from the first tank to the second tank, and also a pump that comprises an inlet connected to the first tank and an outlet connected to the second tank, the pump and the at least one valve of the first pipe being configured to place the upper parts of the first and second tanks in fluidic communication by opening the at least one valve during a transfer of liquid from the first tank to the second tank by way of the pump, the method ensuring a transfer of cryogenic fluid between the first tank and the second tank, wherein the method comprises the steps of:

with the at least one valve of the first pipe being closed and the set of valves of the second pipe being initially closed, opening the at least one valve of the first pipe, thereby pressure equalizing the first and second tanks and lowering the pressure of the second tank from the initial pressure thereof and increasing the pressure of the first tank from the initial pressure therefor; and starting the pump and opening the set of valves of the second pipe, thereby transferring the cryogenic fluid in liquid form from the first tank to the second tank, wherein the pump is disposed outside of the first and second tanks, prior to pressure-equalization between the first and second tanks, precooling the first pipe and/or the second pipe with amounts of gaseous cryogen from the headspace of the first tank, and/or prior to pressure-equalization between the first and second tanks, precooling the first pipe and/or the second pipe with amounts of gaseous cryogen from the headspace of the second tank.

2. The method of claim 1, wherein said step of starting the pump commences when the lowered pressure of the second tank and the increased pressure of the first tank are between 2 and 8 bar, the lowered pressure being higher than the increased pressure.

3. The method of claim 1, wherein a difference between the increased pressure and the decreased pressure is a determined difference of less than 1 bar.

4. The method of claim 1, further comprising a step of pressurizing the first tank or the second tank using an atmospheric heater when a net positive suction head of the pump becomes insufficient for the transfer of cryogenic fluid from the first tank to the second tank.

5. The method of claim 1, wherein the second pipe connects the lower part of the first tank to the lower part of the second tank.

6. The method of claim 1, wherein the cryogenic fluid is hydrogen.

7. The method of claim 1, wherein method uses only one pump to transfer the cryogenic fluid between the first and second tanks.

* * * * *